US011902452B2

(12) United States Patent
Lobo et al.

(10) Patent No.: US 11,902,452 B2
(45) Date of Patent: Feb. 13, 2024

(54) TECHNIQUES FOR DATA RETRIEVAL USING CRYPTOGRAPHIC SIGNATURES

(71) Applicant: Rubrik, Inc., Palo Alto, CA (US)

(72) Inventors: Sean Lobo, Fremont, CA (US); Prasanta Ranjan Dash, San Jose, CA (US); Hao Wu, Mountain View, CA (US)

(73) Assignee: Rubrik, Inc., Palo Alto, CA (US)

(*) Notice: Subject to any disclaimer, the term of this patent is extended or adjusted under 35 U.S.C. 154(b) by 269 days.

(21) Appl. No.: 17/521,661

(22) Filed: Nov. 8, 2021

(65) Prior Publication Data

US 2023/0145634 A1 May 11, 2023

(51) Int. Cl.
*H04L 9/32* (2006.01)
*H04L 67/06* (2022.01)
*H04L 9/08* (2006.01)

(52) U.S. Cl.
CPC .......... *H04L 9/3247* (2013.01); *H04L 9/0825* (2013.01); *H04L 9/0863* (2013.01); *H04L 9/3242* (2013.01); *H04L 9/3297* (2013.01); *H04L 67/06* (2013.01)

(58) Field of Classification Search
CPC ... H04L 9/3247; H04L 9/0825; H04L 9/0863; H04L 9/3242; H04L 9/3297; H04L 67/06; H04L 63/126; H04L 2463/062; H04L 2463/121; H04L 9/0894; G06F 2201/835; G06F 11/1469; G06F 2201/84; G06F 21/64; G06F 2221/2151; G06F 21/6218; G06F 21/645

See application file for complete search history.

(56) References Cited

U.S. PATENT DOCUMENTS

| | | | |
|---|---|---|---|
| 6,574,609 B1* | 6/2003 | Downs | H04L 9/0822 380/258 |
| 7,120,675 B1* | 10/2006 | Shupak | G06F 8/65 717/173 |
| 9,466,037 B2* | 10/2016 | Reed | G06Q 30/06 |
| 2005/0131961 A1* | 6/2005 | Margolus | G06F 21/60 |
| 2006/0095792 A1* | 5/2006 | Hurtado | H04L 9/083 713/189 |
| 2007/0169199 A1* | 7/2007 | Quinnell | H04L 63/1433 726/25 |
| 2007/0220328 A1* | 9/2007 | Liu | G06F 11/1435 714/24 |
| 2008/0005120 A1* | 1/2008 | Li | H04L 67/104 |

(Continued)

*Primary Examiner* — J. Brant Murphy
(74) *Attorney, Agent, or Firm* — Holland & Hart LLP

(57) ABSTRACT

A second data source may retrieve metadata for one or more versions of a set of versions of a file stored at the first data source. In some examples, the metadata for the one or more versions of the file may include at least an identifier of the file, a timestamp, and a cryptographic signature. In some examples, generation of the cryptographic signature may be based on the identifier of the file, the timestamp, and a cryptographic key. The second data source may identify a set of versions of the file that were uploaded from a trusted data source to the first data source based on a comparison of the cryptographic signature to a computed cryptographic signature. The second data source may then determine a targeted version of the file and retrieve the targeted version of the file from the first data source.

20 Claims, 12 Drawing Sheets

(56) References Cited

U.S. PATENT DOCUMENTS

| | | | |
|---|---|---|---|
| 2011/0093701 A1* | 4/2011 | Etchegoyen | G06F 21/121 |
| | | | 713/176 |
| 2011/0179279 A1* | 7/2011 | Greevenbosch | G06F 21/10 |
| | | | 713/176 |
| 2014/0304512 A1* | 10/2014 | Kotov | H04L 9/14 |
| | | | 713/171 |
| 2020/0014816 A1* | 1/2020 | Speasl | H04N 1/00129 |
| 2023/0237349 A1* | 7/2023 | Donoho | G06Q 50/26 |
| | | | 706/46 |

* cited by examiner

US 11,902,452 B2

TECHNIQUES FOR DATA RETRIEVAL USING CRYPTOGRAPHIC SIGNATURES

FIELD OF TECHNOLOGY

The present disclosure relates generally to computer architecture for data backup and restoration, and more specifically to techniques for data retrieval using cryptographic signatures.

BACKGROUND

A computing system may be employed to manage, process, backup, and restore data using a network of computing devices.

Cloud providers may support multiple types of storage for varying customer needs. Software may be built to store data in a file system format and use disk-based data storage on cloud instances. However, disk-based data storage may suffer from issues of durability, reliability, and scalability. Some cloud providers may support immutable data storage, data storage with versioning, or both. Techniques for data retrieval from cloud providers may be improved.

DETAILED DESCRIPTION

Figure 1:
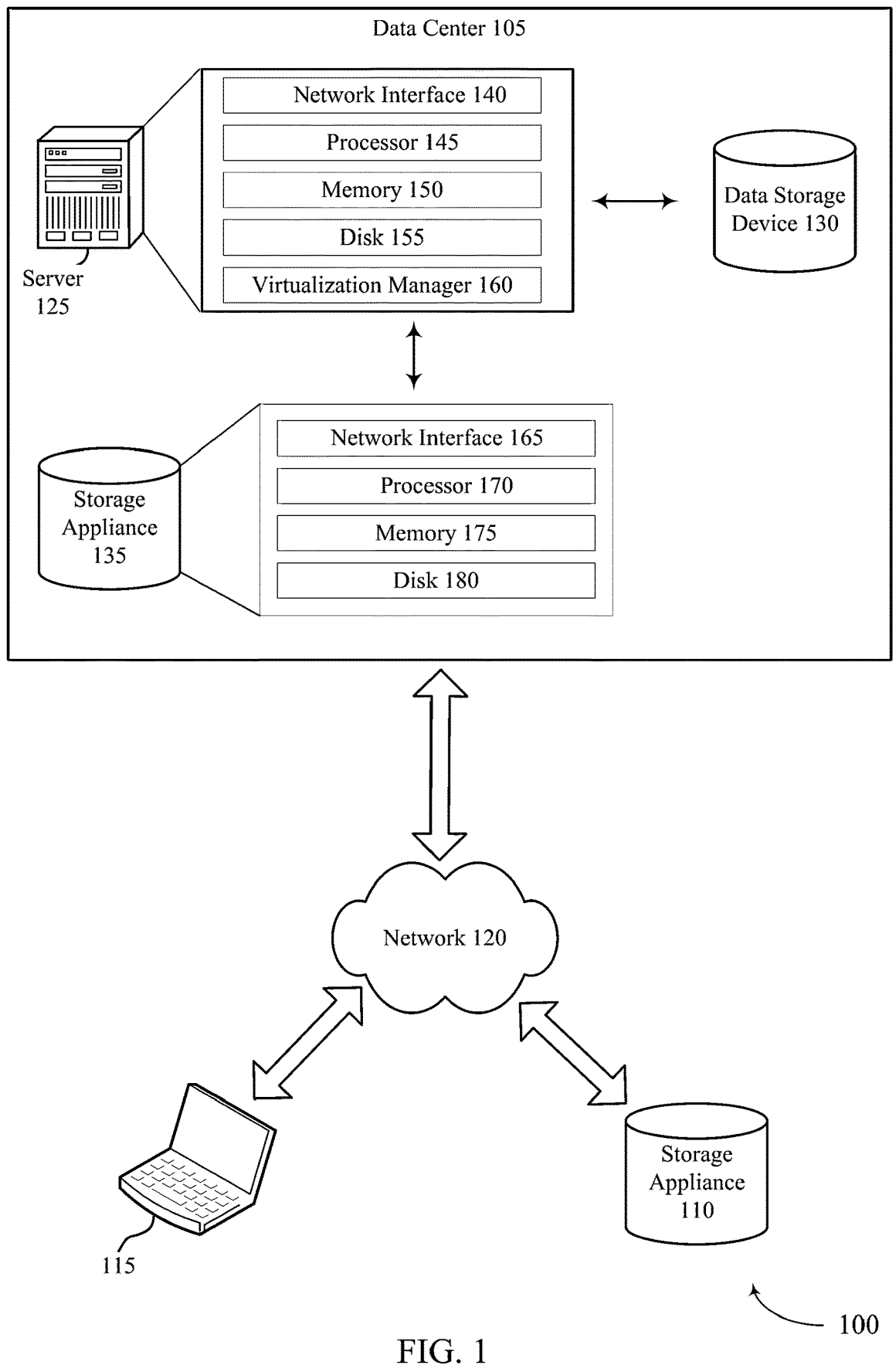
FIG. 1 illustrates an example of a computing environment that supports techniques for data retrieval using cryptographic signatures in accordance with aspects of the present disclosure.

Some cloud data storage services may support immutable data storage, data storage with versioning, or both. In some examples, a user may have an account at the cloud data storage services. A local data source may provide an interface to upload and retrieve data files from the cloud data storage services for backup, failover, or the like. If a malicious attacker gains access to a user's cloud data storage account, then they would be capable of overwriting, deleting, or encrypting files stored on the cloud storage. If the cloud data storage is configured for immutable and versioned storage, edits to a file will result in the creation of new versions of that file. In such cases, there may be an arbitrary number of copies or versions of a file, some of which might be legitimate (e.g., generated or uploaded by the user or a trusted data source) and some of which might be written by a malicious attacker. In some examples, the local data source may be configured to download the latest version of a file by default, which may be a version created by a malicious attacker.

To identify an authentic version of a file for download, the techniques depicted herein provide for generating user metadata with some characteristics when uploading or otherwise transferring a file to the cloud data source. When uploading a file, the local data source may generate an identifier of the file (e.g., key identifying a file name), a current timestamp (e.g., a timestamp when the file was received for upload), and a cryptographic signature. The cryptographic signature may be based on a combination of the identifier, the timestamp and a cryptographic key associated with an archival location at the cloud data source. When downloading a file to a local data source, the local data source may utilize the metadata to determine the version of the file is an authentic file (e.g., not corrupted by a malicious attacker). In some examples, the local data source may determine a version of the file that is the most recent authentic version in the case where there are multiple authentic versions retrieved from the cloud data source. Specifically, the local data source may use the cryptographic signature to filter out versions that are not related to the file name being retrieved. Additionally or alternatively, the local data source then uses the timestamp information in the metadata to differentiate between a version of a file that was authentically generated by the local data source and the versions of the file created by a malicious attacker.

Aspects of the disclosure are initially described in the context of an environment supporting an on-demand data backup and retrieval services. Aspects of the disclosure are further described in the context of computing systems and process flow. Aspects of the disclosure are further illustrated by and described with reference to apparatus diagrams, system diagrams, and flowcharts that relate to techniques for data retrieval using cryptographic signatures.

FIG. 1 illustrates an example of a computing environment 100 for cloud computing that supports techniques for data retrieval using cryptographic signatures in accordance with various aspects of the present disclosure. The computing environment 100 may include a data center 105, a storage appliance 110, and a computing device 115 in communication with each other via one or more networks 120. The system 100 may also include one or more computing devices interconnected through one or more networks 120. The one or more networks 120 may allow computing devices or storage devices to connect to and communicate with other computing devices or other storage devices. In some examples, the system 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure.

The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a data center, such as data center 105, may include multiple servers and/or data storage devices in communication with each other. The one or more data storage devices 130 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. Network interface 140 allows server 125 to connect to one or more networks 120. Network interface 140 may include a wireless network interface and/or a wired network interface. Processor 145 allows server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., RAM, SRAM, DRAM, ROM, EEPROM, Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 110 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 135 or storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 115. The storage appliance 110 may comprise a cloud-based data management system for backing up virtual machines and/or files within a virtualized infrastructure, such as virtual machines running on server 125 or files stored on server 125.

In some examples, networked computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

In accordance with aspects of the present disclosure, the computing environment 100 may utilize user metadata when transferring data between data center 105 and storage appliance 110. For example, the data center 105 may be an example of a local data source and the storage appliance 110 may be an example of a remote data source (e.g., a cloud-based data source). In some examples, the data center 105 (or one or more components or aspects of the data center 105) may retrieve metadata for one or more versions of a plurality of versions of a file stored at the storage appliance 110, where the metadata for the one or more versions of the file includes at least an identifier of the file, a timestamp associated with uploading of the file to the storage appliance 110, and a cryptographic signature, where generation of the cryptographic signature is based at least in part on the identifier of the file, the timestamp associated with the uploading of the file, and a cryptographic key associated with an archival location in the storage appliance 110. The data center 105 may identify from the plurality of versions of the file, a set of versions of the file that were uploaded from a trusted data source to the storage appliance 110 based at least in part on a comparison of the cryptographic signature from the retrieved metadata for the one or more versions of the plurality of versions of the file to a computed cryptographic signature that is computed using at least the cryptographic key associated with the archival location in the storage appliance 110. The data center 105 may determine from the set of versions of the file that were uploaded from the trusted data source to the storage appliance 110, a targeted version of the file, and may retrieve the targeted version of the file from the storage appliance 110 to the data center 105 based at least in part on the determining.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
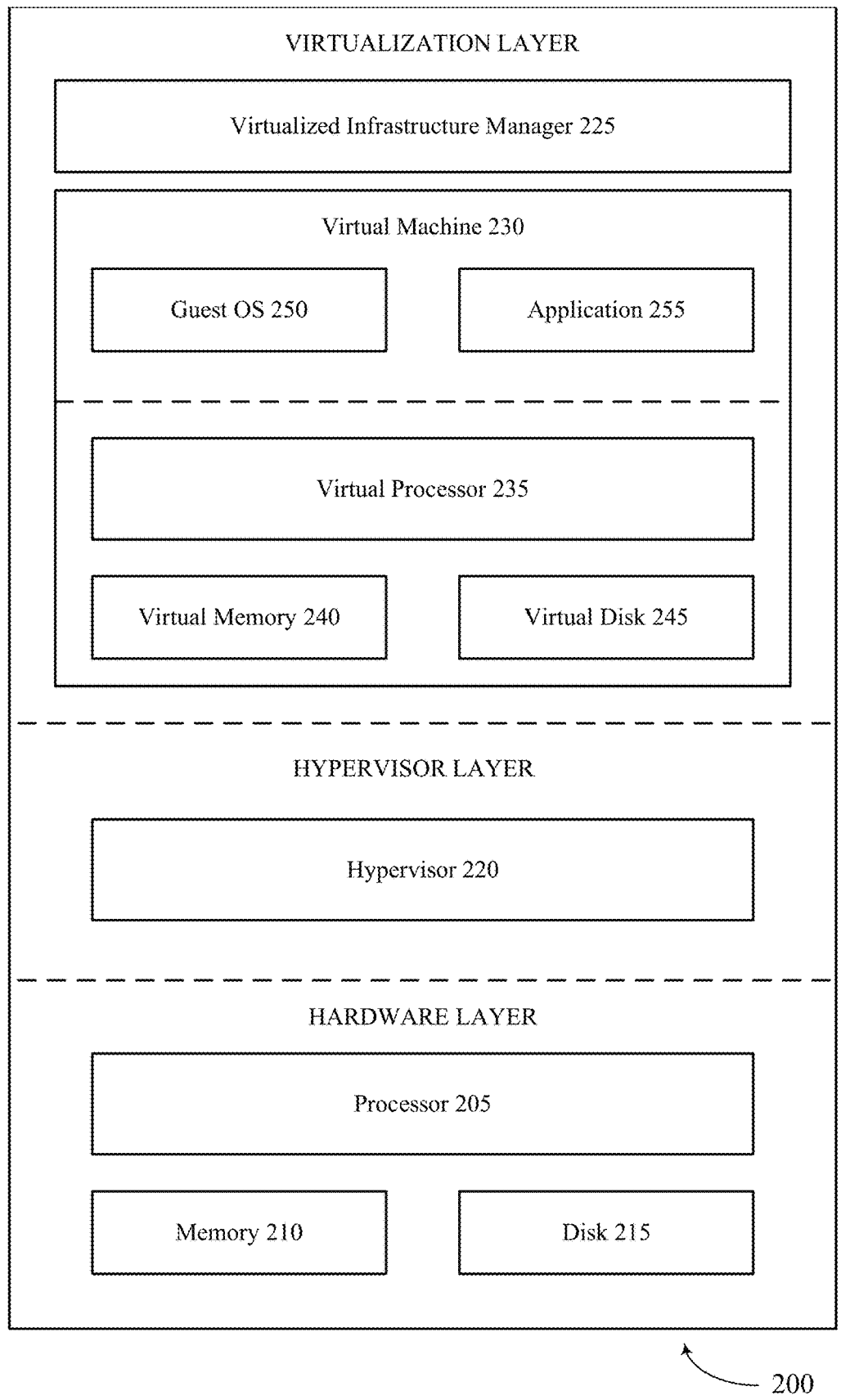
FIG. 2 illustrates an example of a server that supports techniques for data retrieval using cryptographic signatures in accordance with aspects of the present disclosure.

FIG. 2 illustrates an example of a server 200 that supports techniques for data retrieval using cryptographic signatures in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more disks 245. In one example, a virtual machine 230 may include a plurality of virtual disks 245, with each virtual disk of the plurality of virtual disks 245 associated with a different file stored on the one or more disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance). In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

In accordance with aspects of the present disclosure, the server 200 may utilize user metadata when transferring data between the server 200 and a storage appliance (e.g., storage appliance 110 from FIG. 1). For example, the server 200 may be an example of a local data source and the storage appliance 110 may be an example of a remote data source (e.g., a cloud-based data source). In some examples, the server 200 (or one or more components or aspects of the server 200) may retrieve metadata for one or more versions of a plurality of versions of a file stored at the storage appliance 110, where the metadata for the one or more versions of the file includes at least an identifier of the file, a timestamp associated with uploading of the file to the storage appliance 110, and a cryptographic signature, where generation of the cryptographic signature is based at least in part on the identifier of the file, the timestamp associated with the uploading of the file, and a cryptographic key associated with an archival location in the storage appliance 110. The server 200 may identify from the plurality of versions of the file, a set of versions of the file that were uploaded from a trusted data source to the storage appliance 110 based at least in part on a comparison of the cryptographic signature from the retrieved metadata for the one or more versions of the plurality of versions of the file to a computed cryptographic signature that is computed using at least the cryptographic key associated with the archival location in the storage appliance 110. The server 200 may determine from the set of versions of the file that were uploaded from the trusted data source to the storage appliance 110, a targeted version of the file, and may retrieve the targeted version of the file from the storage appliance 110 to the server 200 based at least in part on the determining.

Figure 3:
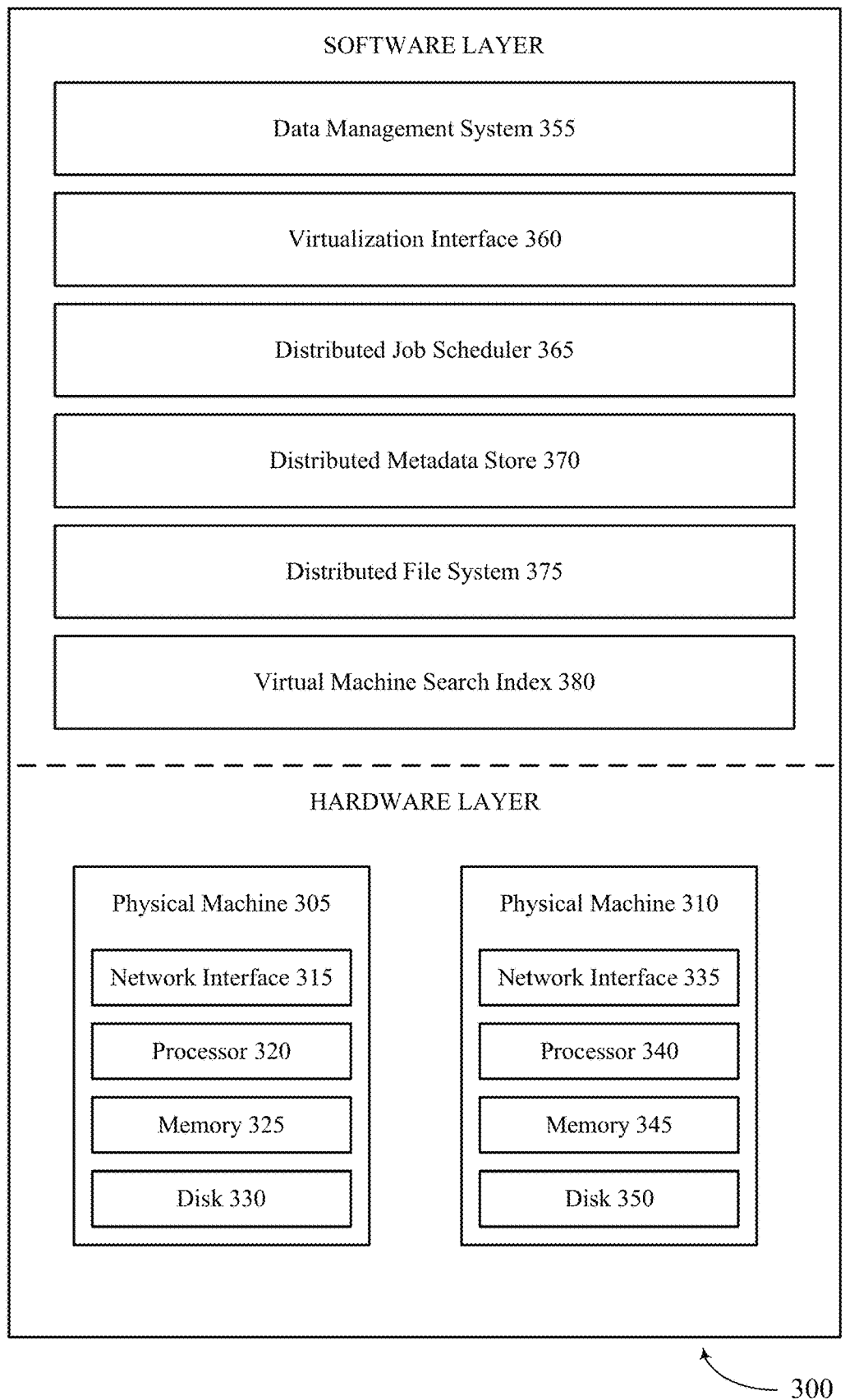
FIG. 3 illustrates an example of a storage appliance that supports techniques for data retrieval using cryptographic signatures in accordance with aspects of the present disclosure.

FIG. 3 illustrates an example of a storage appliance 300 that supports techniques for data retrieval using cryptographic signatures in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G−i modulo N. In another example, given a number (N) of nodes in a cluster from node(0) to node(N−1), for a floating IP address (i), the VRRP priority of node G may be (i−j)

modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/sl/sl.c-hunkl). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., a file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

Some data sources (e.g., storage appliance 300) may support immutability, which may result in file versioning. A delete operation on an immutability locked object may still succeed at a data source supporting immutability. However, a delete operation on a file in such data sources may result in generation of a new version of the file (e.g., "delete-marker" version). Similarly, an overwrite of an existing file also succeeds, creating a new version of the existing file. A malicious attacker may gain access to the files stored in the immutable data source. However, a delete, an overwrite, or an edit operation by the malicious attacker at the data source may lead to generation of new versions of the file. Even though another data source may be able to download or otherwise retrieve all versions of a file, it may be important to identify which versions of a file are authentic (e.g., uploaded or generated by a user having valid credentials to the immutable data source) versus those versions of the file that were edited or otherwise corrupted by a malicious attacker.

Aspects of the present disclosure are described in the context of data being transferred between one or more data sources. For example, data (e.g., files or portions of files of any format) may be uploaded or otherwise transferred from a local data source (e.g., data storage appliance, database, server) to a remote data source (e.g., an archival data source such as a cloud-based data storage appliance, database or server) and then later downloaded or otherwise transferred from the remote data source to the local data source or to a different data source. Although the examples are provided in the context of local and remote data sources, it should be understood that these are just illustrative examples, and that the data transfer and related techniques described herein may occur between data sources of any type.

For example, according to one or more aspects of the present disclosure, a local data source may establish a reader connection with immutable archival locations at a remote data source. The local data source may employ techniques to be resilient to an attacker who has gained access to the remote data source. In some examples, the remote data source may expose the ability to upload arbitrary key/value pairs of string metadata with each upload call. In some aspects, an object metadata may be immutable once written, and may be modified by creating a new version of the underlying object with modified metadata. Therefore, metadata written to the remote data source is safe from any malicious attackers. According to the techniques depicted herein, the local data source may include custom versioning metadata with upload of each object, to allow a reader connection to identify the current version of a file when downloading. The technique relies on a unique and unknown private key being present for the archival location. In some cases, such a key may exist for password-based encrypted archival locations.

According to one or more aspects, a user may initiate creation of a password-based encrypted archival location (e.g., by providing a user password). The local data source may pass the password into a call to the archival location. Such a call may generate a random cryptographic key and may encrypt the random cryptographic key using the user password. The local data source may store the randomly generated cryptographic key and the encrypted version inside local metadata on a cluster within the local data source. In some examples, the local data source may upload the cryptographic key to the archival location. When a separate disaster recovery cluster connects as a reader to the archival location, the disaster recovery cluster may access the remote data source using the user-provided password. This password may be used to decrypt the previously uploaded encrypted cryptographic key. Once retrieved, the disaster recovery cluster may use the cryptographic key to decrypt all files on the archive.

Aspects of the present disclosure provide for including user metadata in an upload of a file, where the user metadata may be analyzed upon downloading multiple versions of the file to determine which versions are authentic (e.g., originally uploaded by an authorized user and/or from a trusted data source). In some examples, upon receiving a request or an indication to upload a file, the local data source may calculate a current timestamp (either a formatted date string or an epoch timestamp) and may calculate a cryptographic signature using both the timestamp, as well as the key (e.g., identifier) associated with the file. If there are multiple uploads for the same key from the local data source, then each version may contain its own metadata with unique timestamps and signatures.

When downloading a file from a cluster residing in the remote data source, the local data source may utilize local versioning metadata. If the local versioning metadata indicates a unique version of the file, then the local data source may download the specific version referenced by local metadata. If the local versioning metadata does not indicate a unique version of the file, then the local data source may download a content for key. The local data source may iterate through all versions of the key and download the object having a key included in the metadata with the highest or latest encrypted timestamp. By utilizing the user metadata to upload a file, the techniques depicted herein may provide a means for selecting the secure or authenticated version while retrieving a file from a remote data source.

Figure 4:
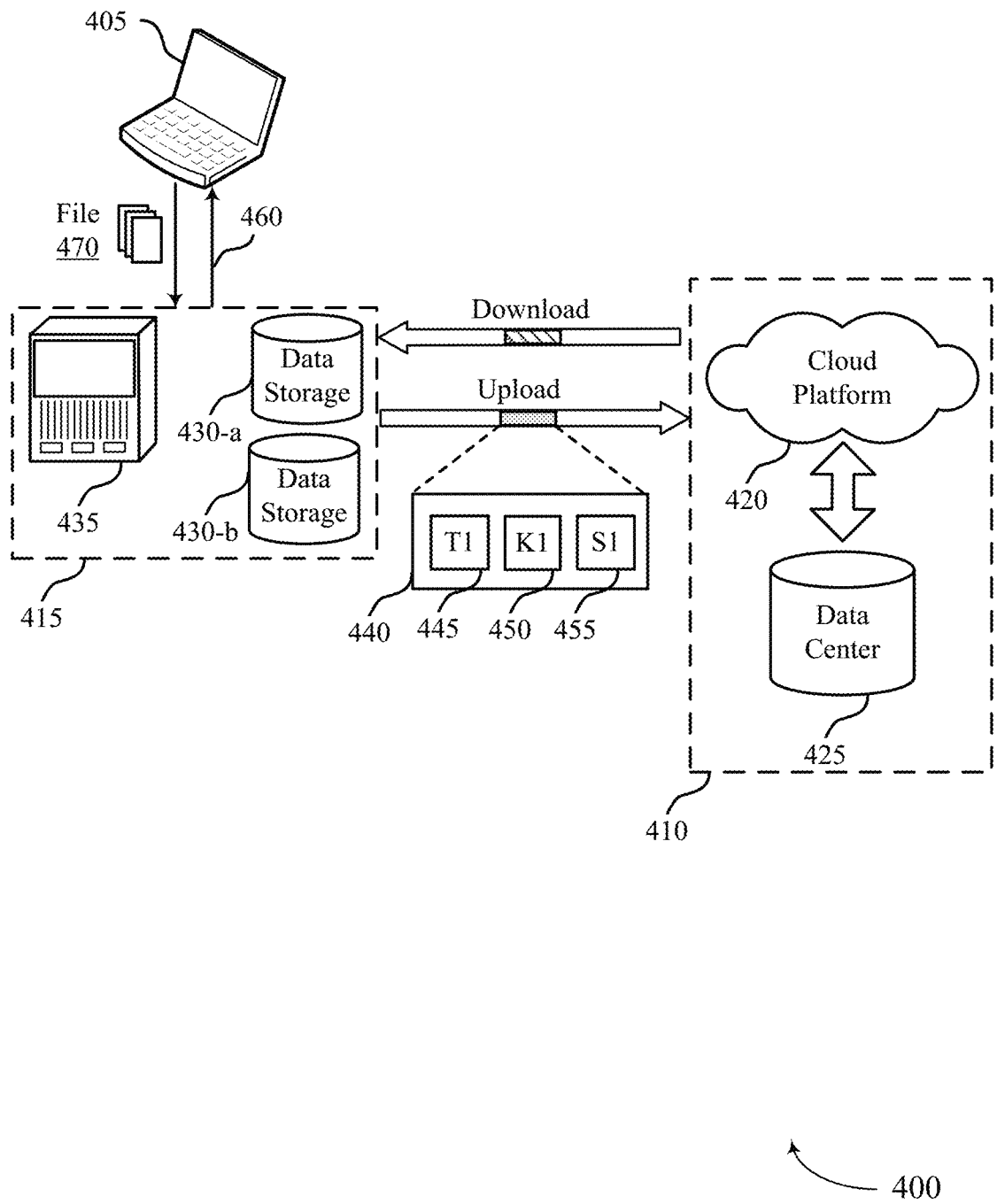
FIG. 4 illustrates an example of a computing system that supports techniques for data retrieval using cryptographic signatures in accordance with aspects of the present disclosure.

FIG. 4 illustrates an example of a computing system 400 that supports techniques for data retrieval using cryptographic signatures in accordance with aspects of the present disclosure. The computing system 400 includes a user device 405, a first data source 410 and a second data source 415. The user device 405 may be example of a device described with reference to FIG. 1. The user device 405 may also be an example of a cloud client. A cloud client may access data sources using a network connection. The network may implement transfer control protocol and internet protocol (TCP/IP), such as the Internet, or may implement other network protocols. The user device 405 may be an example of a user device, such as a server, a smartphone, or a laptop. In other examples, a user device 405 may be a desktop computer, a tablet, a sensor, or another computing device or system capable of generating, analyzing, transmitting, or receiving communications. In some examples, the user device 405 may be operated by a user that is part of a business, an enterprise, a non-profit, a startup, or any other organization type.

The first data source 410 may be an example of a remote data source. The first data source 410 may also be an example of a cloud-based storage and an on-demand computing platform. As depicted in the example of FIG. 4, the first data source 410 may include a cloud platform 420 and a data center 425. The cloud platform 420 may offer an on-demand storage and computing services to the user device 405. In some cases, the first data source 410 may be an example of a storage system with built-in data management. The first data source 410 may serve multiple users with a single instance of software. However, other types of systems may be implemented, including—but not limited to—client-server systems, mobile device systems, and mobile network systems. The second data source 415 may be an example of an integrated data management and storage system. The second data source 415 may include a distributed cluster of storage nodes (e.g., data storage 430-*a* and data storage 430-*b*) and an application server 435. The storage nodes 430 and the application server 435 may collectively represent a unified storage system even though numerous storage nodes may be connected together and the number of connected storage nodes may change over time as storage nodes are added to or removed from the cluster.

As depicted herein, the second data source 415 may support an integrated data management and storage system and may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the retrieval of data (e.g., a correct version of a file) using cryptographic signatures. In some examples, the second data source 415 may retrieve data (e.g., one or more files) residing on virtual machines and/or real machines (e.g., a hardware server, a laptop, a tablet computer, a smartphone, or a mobile computing device).

In some examples, the first data source 410 may support immutability for data and metadata stored at the first data source 410. Versioning may also be enabled for data stored in the first data source 410. In some cases, the first data source 410 may support a delete operation on an immutable locked object (data object) resulting in generation of a new "delete-marker" version. Similarly, an overwrite of an existing object also succeeds in the first data source 410, creating a new version of an existing key. When an immutable object is deleted or overwritten, a locked version of the data object may however still be preserved. The second data source 415 may be configured to retrieve a data object using an object version. However, attempting to download or list a key with a delete marker present without providing a version may result in an error. Additionally or alternatively, data sources may use APIs to query for all versions of a key, and downloading a key while explicitly providing a version may download the requested version. In some examples, the first data source 410 and the second data source 415 may support owner clusters where one or more data objects are written to an immutable bucket (stored in the first data source 410).

In some examples, the data sources may track a version of data in a metadata store for all data objects. The second data source 415 may recover any data object using the correct version even if that object is "deleted" by a malicious attacker. However, the second data source 415 may not be configured to store version information in an archive. When data is uploaded to an immutable and versioned bucket in the first data source 410, then each file that is uploaded gets created with a unique "version ID." This version ID may uniquely identify the file uploaded, even if there are multiple versions of data for the same key on the bucket (e.g., the data store in the first data source 410). If an attacker gains access to a customer's account, they would be capable of overwriting, deleting, or encrypting any and all files stored at the first data source 410. When immutability and versioning is enabled, such edits may preserve the original version of all files, and may write new versions when an overwrite or delete occurs. With no immutability or versioning, the first data source 410 may support one version of a given file. With immutable and versioned storage, there may be an arbitrary number of copies stored in the first data source 410. In such cases, if a malicious attacker gains access to the first data source 410, then it may be difficult to determine which versions of files are legitimate and which are written by a malicious actor. Techniques depicted herein provide for selection of a version of a file for downloading a particular key. Without the techniques depicted herein, the second data source 415 may select the latest version identifier of each key for download. However, downloading the latest version identifier of a key may be susceptible to downloading incorrect data if an attacker had overwritten data for some keys.

In some examples, the first data source 410 may support a reader cluster. A reader cluster may recover information about all data objects when connected as a reader. Downloading of a correct version of a data object is important to recover a valid version of all data objects. Aspects of the present disclosure provide for reader connections to archival locations to be resilient to an attacker who has gained access to the first data source 410 (e.g., by gaining access to credentials). A malicious attacker can mark any version of any object as "deleted," "create," and "upload" a new version of any data object. In some examples, a reader cluster may be able to reconstruct metadata stored locally on an owner cluster (data cluster at the second data source 415), just by scanning an archival location.

The metadata stored at the owner cluster stores may be a version identifier (e.g., versionID) of each file written. The second data source 415 may use the version identifier when performing a "GET" call to the first data source 410, to ensure even if the desired key is marked as deleted, or a later version is written by an attacker, the correct version most recently written by the second data source 415 (or another trusted data source) will be accessed.

According to one or more aspects depicted herein, a user device 405 may attempt to upload one or more files 470 to the first data source 410. Additionally or alternatively, the first data source 410 may receive an indication of data (created in the second data source 415). In some examples, data in the first data source 410 may not have originated from the second data source 415 and may be restored to a location different from the second data source 415. In some aspects, the first data source 410 may receive data that originated from one or more trusted data sources. A trusted data source may be referred to as a data source that was authenticated or otherwise authorized by a user having valid credentials. Even though a particular data source is configured to perform a write operation on the first data source 410 at any point in time, the data source writing or otherwise accessing the first data source 410 for write operation may change over time due to failover, fallback or change of role. In some examples, the second data source 415 may generate a user metadata 440 for the file 470 to upload the user metadata 440 to the first data source 410. In some cases, the first data source 410 may receive an upload of user metadata that is immutable at the first data source 410. That is, the first data source 410 may support versioning of the metadata 440.

When uploading the metadata 440, the second data source 415 may first compute a timestamp (T1 445) associated with the uploading of the file 470 as a monotonically increasing timestamp (e.g., current Unix timestamp). For instance, when the second data source 415 attempts to upload a file 470 to an identifier of the file 470 (e.g., key K1 450), the second data source 415 may compute the current Unix timestamp (or any other timestamp implementation that indicates ordering by monotonically increasing). The second data source 415 then accesses a cryptographic key associated with an archival location in the first data source 410. According to some aspects, the cryptographic key may be associated with the data being managed (e.g., a mechanism used to transfer the data). In some cases, the second data source 415 may generate one cryptographic key. However, it is to be understood that the second data source 415 may use a set of cryptographic keys. Additionally or alternatively, the second data source 415 may use a cryptographic key for trusted writers. Such cryptographic keys may not be associated with the trusted writers themselves. Instead, they may be associated with a data location in an object store (e.g., within first data source 410), and a customer's (e.g., user of the user device 405) password. Using just these two pieces of information, any new source can become a trusted writer and subsequently add valid data to the archival location (e.g., within first data source 410). The second data source 415 then generates, using the cryptographic key associated with the archival location in the first data source 410, a cryptographic signature S1 455 based on a combination of the computed monotonically increasing timestamp T1 445 and the identifier of the file K1 450. The second data source 415 may encrypt the cryptographic key associated with the archival location in the first data source 410 using a user-supplied password to generate an encrypted version of the cryptographic key. The second data source 415 may then upload the encrypted version of the cryptographic key to the first data source 410. In some examples, the second data source 415 may generate the cryptographic key using symmetric key encryption.

As depicted herein, the second data source 415 may receive or otherwise identify the file 470 for uploading to the first data source 410. The second data source 415 may log a timestamp T1 445 when the file 470 was received, and may determine an identifier K1 450 (or key) for the file 470. The second data source 415 may then generate the cryptographic signature S1 455 using the timestamp T1 445 and the identifier K1 450. The second data source 415 may upload (using a "put" call) the metadata 440 including a tuple of the identifier K1 450 of the file 470, the timestamp T1 445 (e.g., computed monotonically increasing timestamp), and the cryptographic signature S1 455. Such user metadata 440 may be immutable once written to the first data source 410, and cannot be modified or deleted by a malicious attacker. In some examples, if the second data source 415 attempts to upload data to a key (e.g., an identifier) multiple times, then each upload attempt may include unique user metadata with a unique timestamp and signature. The second data source 415 may also download a file or a version of a file from the first data source 410. The download process is described in further details with reference to FIG. 5.

Figure 5:
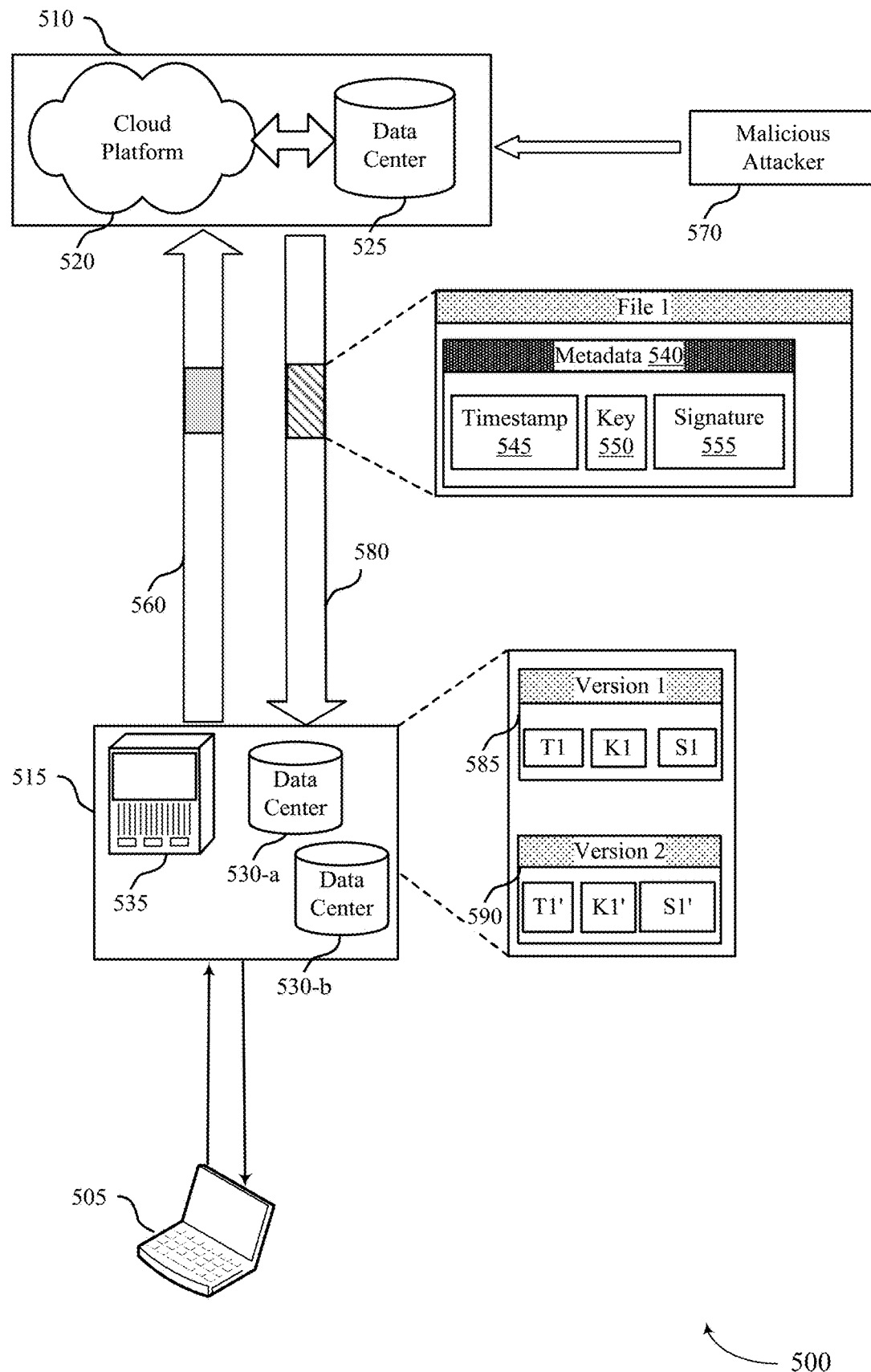
FIG. 5 illustrates an example of a computing system that supports techniques for data retrieval using cryptographic signatures in accordance with aspects of the present disclosure.

FIG. 5 illustrates an example of a computing system 500 that supports techniques for data retrieval using cryptographic signatures in accordance with aspects of the present disclosure. The computing system 500 includes a user device 505, a first data source 510 and a second data source 515. The user device 505 may be example of a device described with reference to FIGS. 1 and 2. For example, the user device 505 may be an example of a user device, such as a server, a smartphone, a laptop, a desktop computer, a tablet, a sensor, or another computing device or system capable of generating, analyzing, transmitting, or receiving communications.

The first data source 510 may be an example of a remote data source. The first data source 510 may also be an example of a cloud-based storage and an on-demand computing platform. As depicted in the example of FIG. 5, the first data source 510 may include a cloud platform 520 and a data center 525. The cloud platform 520 may offer an on-demand storage and computing services to the user device 505. The second data source 515 may be an example of an integrated data management and storage system. The second data source 515 may include a distributed cluster of storage nodes (e.g., data storage 530-a and data storage 530-b) and an application server 535. The storage nodes 530 and the application server 535 may collectively represent a unified storage system even though numerous storage nodes may be connected together and the number of connected storage nodes may change over time as storage nodes are added to or removed from the cluster.

As depicted with reference to FIG. 5, the second data source 515 may support an integrated data management and storage system and may facilitate upload of data to the first data source 510. It is to be understood that in some examples a single data source may not perform both upload and download of data. Instead, there can be an unbounded N number of trusted writers, as long as they all share the same trusted key. Additionally, the download or recovery of data may happen from a new cluster, as long as a customer (e.g., user of user device 505) is able to enter their credentials such that the new cluster can fetch the trusted key. This new recovery cluster can itself then become a trusted writer. As one example, the data center 530-a may be a trusted data source when uploading data. However, when downloading, the data center 530-b may be a new trusted data source.

In some examples, the second data source 515 may perform an upload operation 560 to upload or write data to the first data source 510. The second data source 515 may utilize the techniques depicted with respect to FIG. 4 to upload data to the first data source 510. For example, the second data source 515 may upload user metadata in conjunction with a file. The user metadata may include a tuple of an identifier of the file (key), a computed monotonically increasing timestamp (timestamp when the file was accessed or received for upload), and a cryptographic signature. In some examples, when an archival location is created and added by a user (e.g., user of user device 505), the second data source 515 may generate a unique cryptographic key for the location. The second data source 515 may save the cryptographic key on a cluster in an encrypted format. In some examples, the second data source 515 may upload the encrypted key to the archival location for consumption during the reader workflow. The second data source 515 may use the cryptographic key in combination with the timestamp and the key to generate a cryptographic signature. Thus, when uploading a file to a key, the second data source 515 may also upload a user metadata including a tuple of the key, the timestamp, and the cryptographic signature.

The user metadata is immutable once written to the first data source 510, and cannot be modified or deleted by a malicious attacker. In some examples, a malicious attacker 570 may attack the first data source 510 (e.g., gain access without authorization to modify data). As an attack, the malicious attacker 570 may modify one or more versions of a file saved in the first data source 510. In such cases, the techniques depicted herein provide for the second data source 515 to securely perform a download operation 580 such that the downloaded file is an authentic of valid version uploaded by a trusted data source (e.g., the second data source 515 or some other trusted data source).

When attempting to download a key, the second data source 515 may first check if local metadata contains a reference to a specific version identifier. For example, the second data source 515 may check for local metadata that indicates a version identifier that uniquely identifies a targeted version of the file for download. If the second data source 515 determines that a specific version identifier is present in the local metadata for the second data source 515, then the second data source 515 may download a key for that version identifier. For instance, the second data source 515 may specify a particular version (by specifying a corresponding version identifier) when attempting to download a file. In some examples, the second data source 515 may retrieve metadata for one or more versions of set of versions of a file stored at the first data source 510 based on an absence from the local metadata of the version identifier that uniquely identifies the targeted version.

If the second data source 515 determines that the local metadata does not include a version identifier, then the second data source 515 may retrieve metadata 540 for one or more versions of the set of versions of the file stored at the first data source 510. As depicted herein, the metadata for the one or more versions of the file may include at least an identifier 550 (e.g., key) of the file, a timestamp 545 associated with uploading of the file to the first data source 510, and a cryptographic signature 555. In some examples, generation of the cryptographic signature is based on the identifier 550 of the file, the timestamp 545 associated with the uploading of the file, and a cryptographic key associated with an archival location in the first data source 510.

The second data source 515 may list all versions of key which exist on an archival target (e.g., archival location in the first data source 510), and download user metadata for all of them. For each key, version identifier, and metadata combination tuple, the second data source may verify that the signature contained in the downloaded metadata matches the timestamp and key of the metadata, as well as the key being retrieved. For example, the second data source 515 may identify, from the set of versions of the file, a set of versions of the file that were uploaded from a trusted data source (either the second data source 515 or another trusted data source) to the first data source 510 based on a comparison of the cryptographic signature from the retrieved metadata for the one or more versions of the set of versions of the file to a computed cryptographic signature that is computed using at least the cryptographic key associated with the archival location in the first data source 510.

In order to verify that the signature contained in the downloaded metadata matches the timestamp, key of the metadata, and the key being retrieved, the second data source 515 may compute the cryptographic signature 555 using the cryptographic key associated with the archival location in the first data source 510 and based on the timestamp associated with the uploading of the file and the identifier 550 of the file. The second data source 515 may then verify that the cryptographic signature 555 from the retrieved metadata 540 matches the computed cryptographic signature. In some examples, the second data source 515 may filtering the set of versions of the file that were uploaded from the trusted data source to the first data source 510 from the one or more versions of the set of versions based on the verifying. That is, the second data source 515 may filter out metadata where the stored signature does not match with a computed signature on the stored key and timestamp. These values will match if the metadata was written by the second data source 515 (or by another trusted data source with access to the cryptographic key as described above). A malicious attacker 570 may be able to generate a valid cryptographic signature only if they had access to the cryptographic key from the archival location (the cryptographic key may be generated based on a user password, may be random, or may use any other scheme). The archival location may store the encrypted cryptographic key and the user password or passphrase that is used to encrypt the key is not stored anywhere.

After filtering out any version identifiers of a key which are not valid, the second data source 515 may select a largest timestamp. In some examples, the largest timestamp may correspond to a latest time when the second data source 515 attempted to write data for a particular key. Accordingly, the second data source 515 may determine, from the set of versions of the file that were uploaded from the trusted data source to the first data source 510, a targeted version of the file (e.g., a latest version of file). The second data source 515 may retrieve the targeted version of the file from the first data source 510 to the second data source 515. The targeted version of the file may include a latest version of the file within a specified time interval. In some instances, the second data source 515 may identify a trusted version of a file on a given date or prior to a given date. In some examples, the second data source 515 may retrieve an earliest data, latest entry for file for a given month, or date, or prior to some event (e.g., fetch the latest data from the target sent before a malicious attack).

If the second data source 515 determines that there are multiple version identifiers with the same timestamp from user metadata, then the second data source 515 may select the version identifier with an earliest native object timestamp. As depicted in the example of FIG. 5, the second data source 515 may determine that a first version 585 and a second version 590 are associated with a same metadata tuple. For example, the second data source 515 may determine the first version 585 and the second version 590 are associated with the same identifier of the file, a same timestamp associated with the uploading of the file, and a same cryptographic signature. As shown in the example of FIG. 5, the second data source 515 may compare T1 with T1', K1 with K1' and S1 to S1' to determine that the metadata tuple (T1, K1, S1) is the same as the metadata tuple (T1', K1', S1'). In such cases, the second data source 515 compare immutable timestamps allocated by the first data source 510 to the two versions of the file (version 1 and version 2) based on determining that the two versions of the file are associated with the same metadata tuple. The second data source 515 may then select an earliest immutable timestamp from the immutable timestamps allocated by the first data source 510. The immutable timestamp may be the timestamp allocated by the first data source 510 and may include the time this version was created at the first data source 510. As such, selecting the earliest of the immutable timestamp ensures that the version selected was authentically written to the first data source 510, because the version generated by the attacker would have a later immutable timestamp.

By uploading a monotonically increasing timestamp, as well as a cryptographic signature of the timestamp and key, the second data source 515 may be able to generate valid user metadata during file upload. Any data written by an attacker may not include the user metadata, or not include a valid metadata, or be a copy of existing metadata written on the target. According to aspects depicted herein, the second data source 515 may be configured to write valid metadata for various objects to the target. While an attacker may copy otherwise valid metadata when writing malicious data, because the cryptographic signature in the metadata uploaded is generated based on the key, copying metadata from an alternate key may not succeed in corrupting the data retrieval process.

Figure 6:
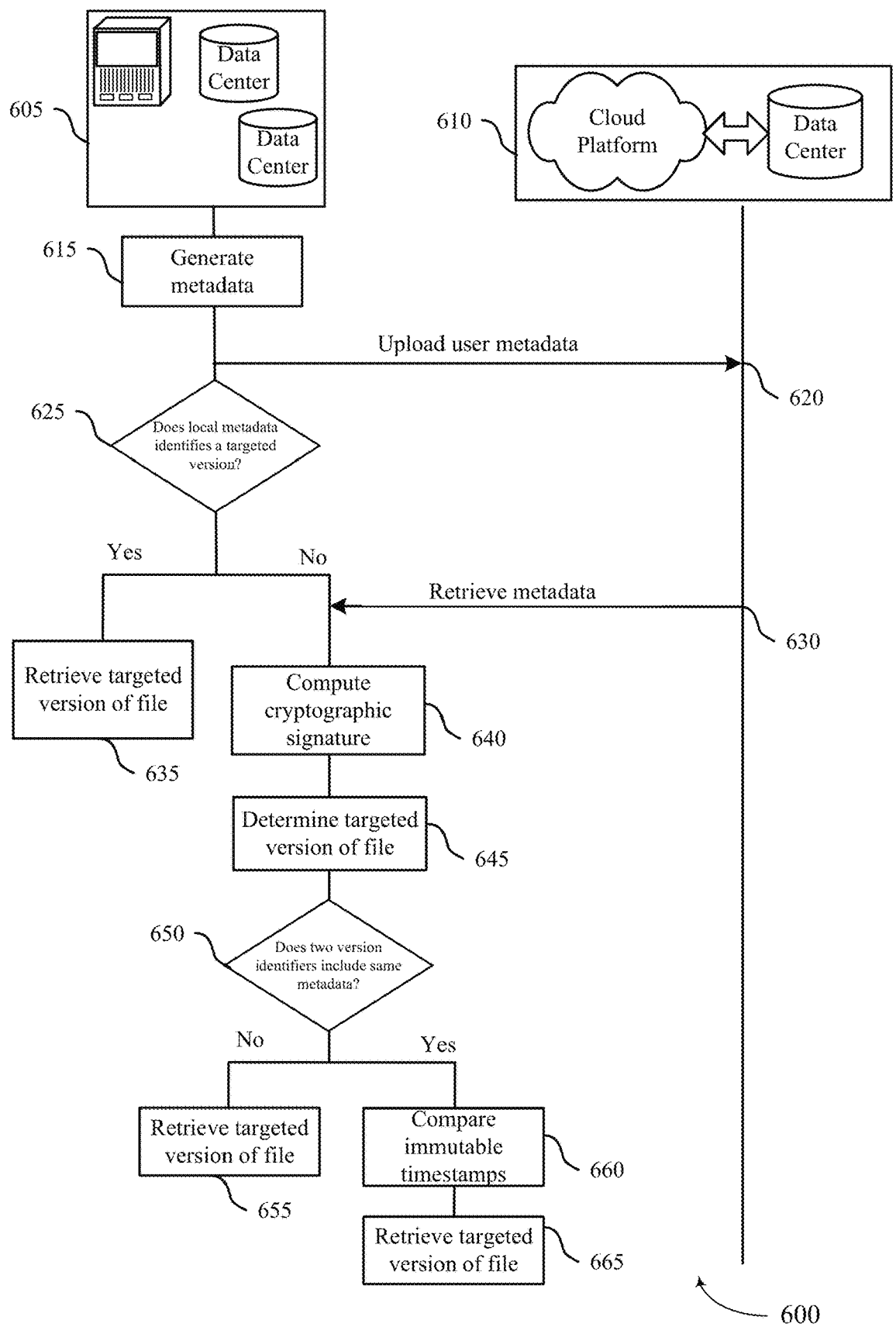
FIG. 6 illustrates an example of a process flow that supports techniques for data retrieval using cryptographic signatures in accordance with aspects of the present disclosure.

FIG. 6 illustrates an example of a process flow 600 that supports techniques for data retrieval using cryptographic signatures in accordance with aspects of the present disclosure. The process flow 600 includes a first data source 610 and a second data source 605. The first data source 610 and the second data source 605 may be an example of the first data source and the second data source as described with respect to FIGS. 4 and 5. Although one data source (e.g., second data source 605) is depicted for uploading in the example of FIG. 6, it may be understood that the process flow 600 may include multiple data sources that may be the same or different. The data sources may represent a set of computing components, data storage components, and the like, as described herein.

In some examples, the operations illustrated in the process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 615, the second data source 605 may generate user metadata for a file. For example, the second data source 605 may receive a file for upload and may compute a timestamp associated with the uploading of the file as a monotonically increasing timestamp. The second data source 605 may then generate, using a cryptographic key associated with an archival location in the first data source 610, a cryptographic signature on a combination of the computed monotonically increasing timestamp and an identifier of the file.

At 620, the second data source 605 may upload, to the first data source 610, user metadata that is immutable at the first data source 610. In some examples, the user metadata may include the identifier of the file, the computed monotonically increasing timestamp, and a cryptographic signature. The user metadata may include a tuple of the identifier of the file, the computed monotonically increasing timestamp, and the cryptographic signature.

At 625, the second data source 605 may check, at the second data source 605, for local metadata that indicates a version identifier that uniquely identifies a targeted version of the file. If the second data source 605 determines that the local metadata indicates the version identifier, then at 635, the second data source 605 may retrieve the targeted version of the file from the first data source 610.

At 630, the second data source 605 may retrieve metadata for one or more versions of a set of versions of a file stored at the first data source 610. In some examples, retrieving the metadata for the one or more versions of the plurality of versions of the file stored at the first data source 610 is based on an absence from the local metadata of the version identifier that uniquely identifies the targeted version. That is, retrieving the metadata at 630 may be based on the check at 625 resulting in a "no." In some cases, the metadata for the one or more versions of the file may include at least an identifier of the file, a timestamp associated with uploading of the file to the first data source 610, and a cryptographic signature. In some examples, generation of the cryptographic signature may be based on the identifier of the file, the timestamp associated with the uploading of the file, and a cryptographic key associated with an archival location in the first data source 610.

At 640, after retrieving the metadata, the second data source 605 may compute a computed cryptographic signature using the cryptographic key associated with an archival location in the first data source 610 and based on the timestamp associated with the uploading of the file and the identifier of the file.

At 645, the second data source 615 may determine the targeted version of file. For example, the second data source 605 may verify that the cryptographic signature from the retrieved metadata matches the computed cryptographic signature. The second data source 605 may then filter the set of versions of the file that were uploaded from the trusted data source to the first data source 610 from the one or more versions of the set of versions based on the verifying.

The second data source 605 may then identify, from the set of versions of the file, a set of versions of the file that were uploaded from a trusted data source to the first data source 610 based on a comparison of the cryptographic signature from the retrieved metadata for the one or more versions of the plurality of versions of the file to the computed cryptographic signature that is computed using at least the cryptographic key associated with the archival location in the first data source 610.

At 650, the second data source 605 may determine whether two versions of the file are associated with a same metadata tuple. That is, the second data source 605 may determine whether the two versions include a same identifier of the file, a same timestamp associated with the uploading of the file, and a same cryptographic signature.

If the second data source 605 determines that the two versions of the file are associated with different metadata tuple, at 655, the second data source 605 may retrieve the targeted version of the file. The second data source 605 then retrieves the targeted version of the file from the first data source 610 to the second data source 605.

If the second data source 605 determines that the two versions of the file are associated with the same metadata tuple, at 660, the second data source 605 may compare immutable timestamps allocated by the first data source 610 to the two versions of the file based on determining that the two versions of the file are associated with the same metadata tuple.

At 665, the second data source 605 may retrieve the targeted version of file. For example, the second data source 605 may select an earliest immutable timestamp from the immutable timestamps allocated by the first data source 610 to the two versions of the file. The second data source 605 then determines the targeted version of the file based on selecting the earliest immutable timestamp.

Figure 7:
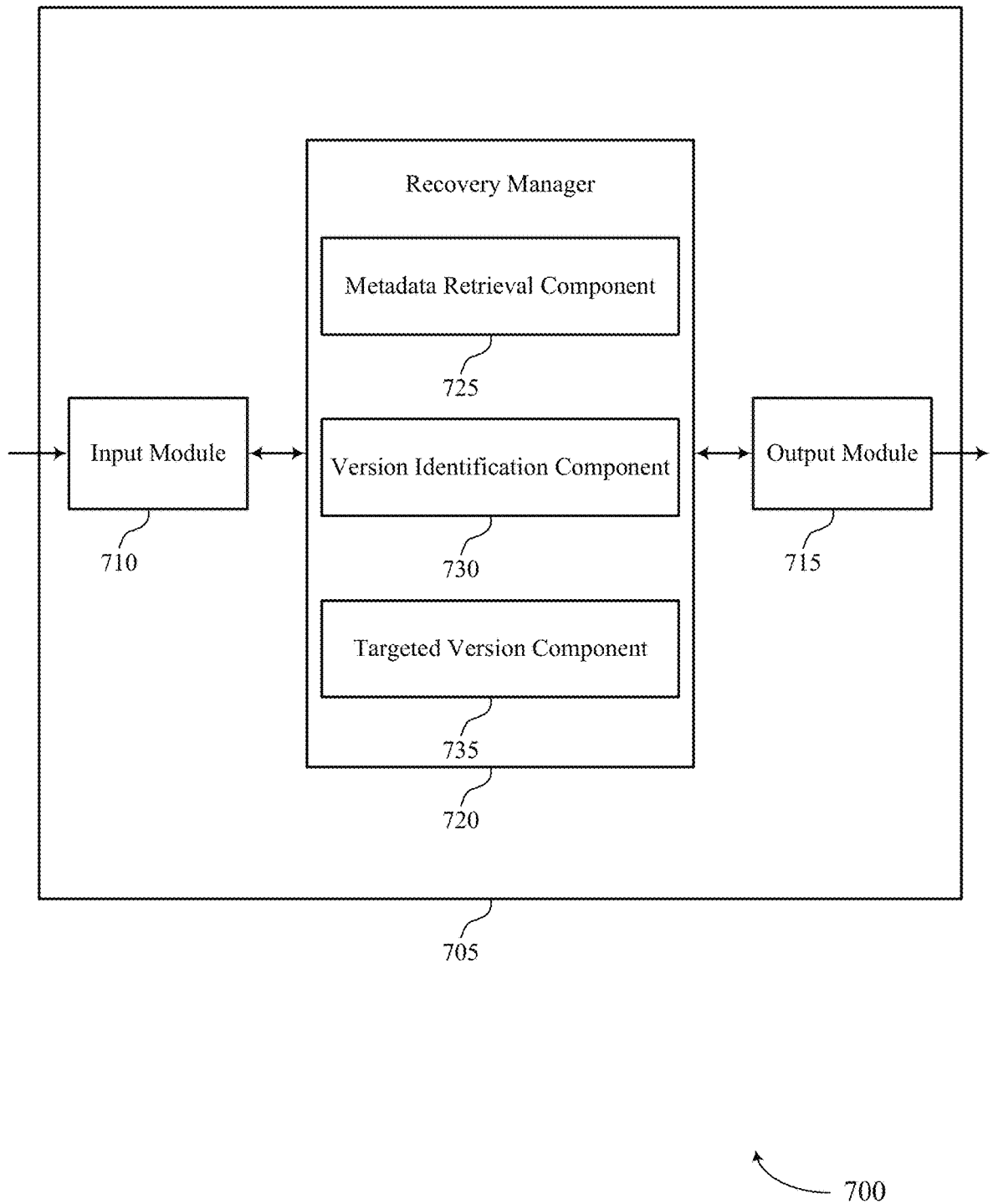
FIG. 7 shows a block diagram of an apparatus that supports techniques for data retrieval using cryptographic signatures in accordance with aspects of the present disclosure.

FIG. 7 shows a block diagram 700 of a device 705 that supports techniques for data retrieval using cryptographic signatures in accordance with aspects of the present disclosure. The device 705 may include an input module 710, an output module 715, and a recovery manager 720. The device 705 may also include a processor. The device 705 may also include a processor, memory, and other hardware or software components for executing instructions stored in the memory as descried herein. Each of these components may be in communication with one another (e.g., via one or more buses).

The input module 710 may manage input signals for the device 705. For example, the input module 710 may identify input signals based on an interaction with one or more components or devices in a networked computing environment as described with reference to FIG. 1. For example, the input module 710 may be an example of a network interface as described with reference to FIG. 1. In some examples, the input module 710 may identify input signals based on an interaction with a modem, a keyboard, a mouse, a touchscreen, or a similar device. These input signals may be associated with instructions or signals received from other components or devices, processing at other components or devices, or user input at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the recovery manager 720 to support techniques for data retrieval using cryptographic signatures. In some cases, the input module 710 may be a component of a network interface 910 as described with reference to FIG. 9.

The output module 715 may manage output signals for the device 705. The output module 715 may be an example of a network interface as described with reference to FIG. 1. For example, the output module 715 may receive signals from other components of the device 705, such as the recovery manager 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of a network interface 910 as described with reference to FIG. 9.

For example, the recovery manager 720 may include a metadata retrieval component 725, a version identification component 730, a targeted version component 735, or any combination thereof. In some examples, the recovery manager 720, or various components thereof, may be configured to perform various operations (e.g., receiving, monitoring, transmitting) using or otherwise in cooperation with the input module 710, the output module 715, or both. For example, the recovery manager 720 may receive information from the input module 710, send information to the output module 715, or be integrated in combination with the input module 710, the output module 715, or both to receive information, transmit information, or perform various other operations as described herein.

The recovery manager 720 may support transferring data from a first data source to a second data source in accordance with examples as disclosed herein. The metadata retrieval component 725 may be configured as or otherwise support a means for retrieving metadata for one or more versions of a plurality of versions of a file stored at the first data source, wherein the metadata for the one or more versions of the file comprises at least an identifier of the file, a timestamp associated with uploading of the file to the first data source, and a cryptographic signature, wherein generation of the cryptographic signature is based at least in part on the identifier of the file, the timestamp associated with the uploading of the file, and a cryptographic key associated with an archival location in the first data source. The version identification component 730 may be configured as or otherwise support a means for identifying, from the plurality of versions of the file, a set of versions of the file that were uploaded from a trusted data source to the first data source based at least in part on a comparison of the cryptographic signature from the retrieved metadata for the one or more versions of the plurality of versions of the file to a computed cryptographic signature that is computed using at least the cryptographic key associated with the archival location in the first data source. The targeted version component 735 may be configured as or otherwise support a means for determining, from the set of versions of the file that were uploaded from the trusted data source to the first data source, a targeted version of the file. The targeted version component 735 may be configured as or otherwise support a means for retrieving the targeted version of the file from the first data source to the second data source based at least in part on the determining.

Figure 8:
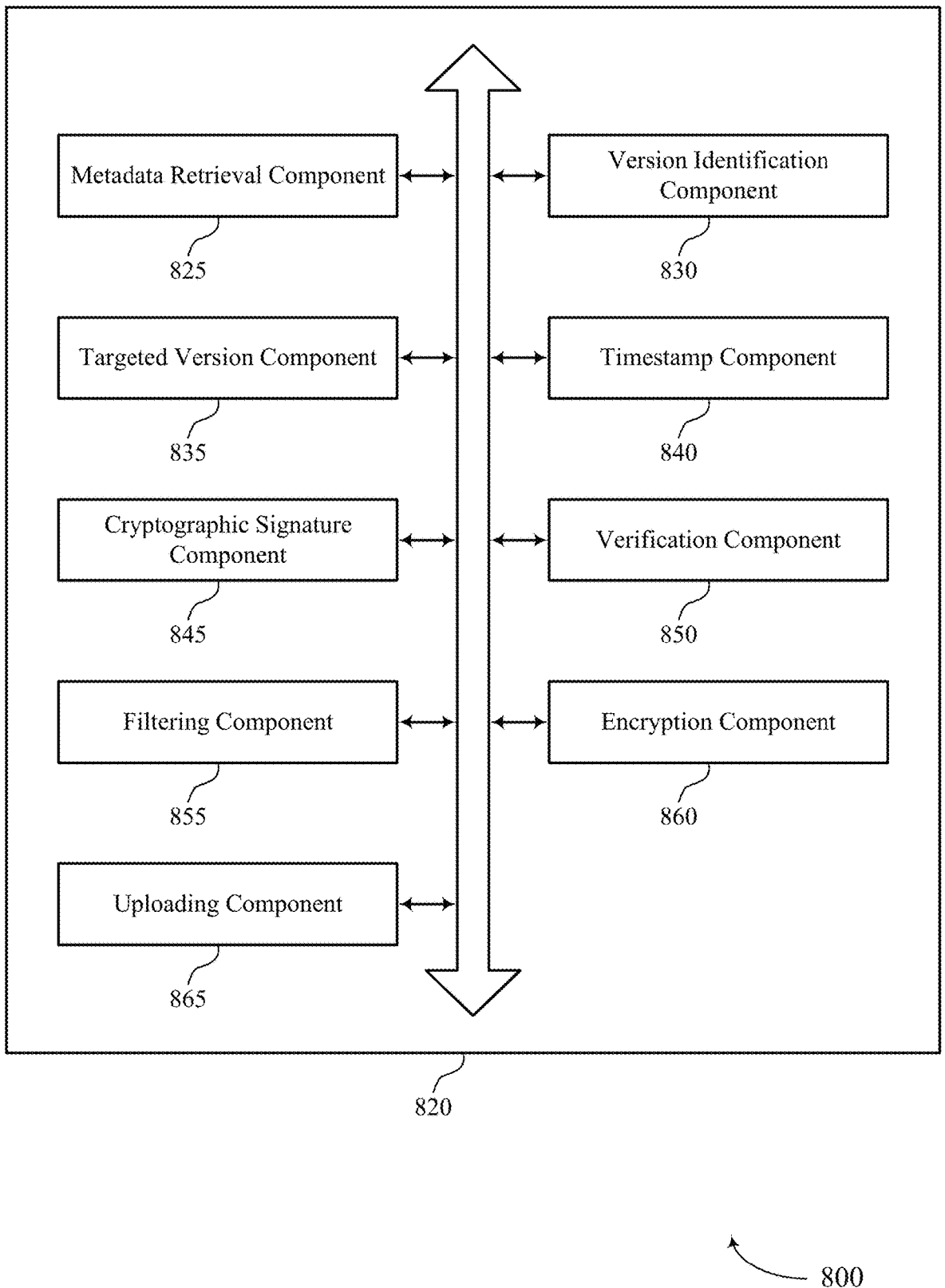
FIG. 8 shows a block diagram of a recovery manager that supports techniques for data retrieval using cryptographic signatures in accordance with aspects of the present disclosure.

FIG. 8 shows a block diagram 800 of a recovery manager 820 that supports techniques for data retrieval using cryptographic signatures in accordance with aspects of the present disclosure. The recovery manager 820 may be an example of aspects of a data source or a recovery manager 720, or both, as described herein. The recovery manager 820, or various components thereof, may be an example of means for performing various aspects of techniques for data retrieval using cryptographic signatures as described herein. For example, the recovery manager 820 may include a metadata retrieval component 825, a version identification component 830, a targeted version component 835, a timestamp component 840, a cryptographic signature component 845, a verification component 850, a filtering component 855, an encryption component 860, an uploading component 865, or any combination thereof. Each of these components may communicate, directly or indirectly, with one another (e.g., via one or more buses).

The recovery manager 820 may support transferring data from a first data source to a second data source in accordance with examples as disclosed herein. The metadata retrieval component 825 may be configured as or otherwise support a means for retrieving metadata for one or more versions of a plurality of versions of a file stored at the first data source, wherein the metadata for the one or more versions of the file comprises at least an identifier of the file, a timestamp associated with uploading of the file to the first data source, and a cryptographic signature, wherein generation of the cryptographic signature is based at least in part on the identifier of the file, the timestamp associated with the uploading of the file, and a cryptographic key associated with an archival location in the first data source. The version identification component 830 may be configured as or otherwise support a means for identifying, from the plurality of versions of the file, a set of versions of the file that were uploaded from a trusted data source to the first data source based at least in part on a comparison of the cryptographic signature from the retrieved metadata for the one or more versions of the plurality of versions of the file to a computed cryptographic signature that is computed using at least the cryptographic key associated with the archival location in the first data source. The targeted version component 835 may be configured as or otherwise support a means for determining, from the set of versions of the file that were uploaded from the trusted data source to the first data source, a targeted version of the file. In some examples, the targeted version component 835 may be configured as or otherwise support a means for retrieving the targeted version of the file from the first data source to the second data source based at least in part on the determining.

In some examples, the timestamp component 840 may be configured as or otherwise support a means for computing the timestamp associated with the uploading of the file as a monotonically increasing timestamp. In some examples, the cryptographic signature component 845 may be configured as or otherwise support a means for generating, using the cryptographic key associated with the archival location in the first data source, the cryptographic signature on a combination of the computed monotonically increasing timestamp and the identifier of the file.

In some examples, the uploading component 865 may be configured as or otherwise support a means for uploading, to the first data source, user metadata that is immutable at the first data source, wherein the user metadata comprises the identifier of the file, the computed monotonically increasing timestamp, and the cryptographic signature. In some examples, the user metadata comprises a tuple of the identifier of the file, the computed monotonically increasing timestamp, and the cryptographic signature.

In some examples, the version identification component 830 may be configured as or otherwise support a means for checking, at the second data source, for local metadata that indicates a version identifier that uniquely identifies the targeted version of the file, wherein retrieving the metadata for the one or more versions of the plurality of versions of the file stored at the first data source is based at least in part on an absence from the local metadata of the version identifier that uniquely identifies the targeted version.

In some examples, to support identifying the set of versions of the file that were uploaded from the trusted data source to the first data source, the cryptographic signature component 845 may be configured as or otherwise support a means for computing the computed cryptographic signature using the cryptographic key associated with the archival location in the first data source and based at least in part on the timestamp associated with the uploading of the file and the identifier of the file. In some examples, to support identifying the set of versions of the file that were uploaded from the trusted data source to the first data source, the verification component 850 may be configured as or otherwise support a means for verifying that the cryptographic signature from the retrieved metadata matches the computed cryptographic signature. In some examples, to support identifying the set of versions of the file that were uploaded from the trusted data source to the first data source, the filtering component 855 may be configured as or otherwise support a means for filtering the set of versions of the file that were uploaded from the trusted data source to the first data source from the one or more versions of the plurality of versions based at least in part on the verifying.

In some examples, the targeted version component 835 may be configured as or otherwise support a means for determining, from the retrieved metadata, that at least two versions of the one or more versions of the file are associated with a same metadata tuple comprising a same identifier of the file, a same timestamp associated with the uploading of the file, and a same cryptographic signature.

In some examples, the timestamp component 840 may be configured as or otherwise support a means for comparing immutable timestamps allocated by the first data source to the at least two versions of the file based at least in part on determining that the at least two versions of the one or more versions of the file are associated with the same metadata tuple. In some examples, the timestamp component 840 may be configured as or otherwise support a means for selecting an earliest immutable timestamp from the immutable timestamps allocated by the first data source to the at least two versions of the file.

In some examples, determining the targeted version of the file is based at least in part on selecting the earliest immutable timestamp. In some examples, the cryptographic signature comprises a hash-based message authentication code signature. In some examples, the second data source comprises a local data source and the first data source comprises a remote data source. In some examples, the remote data source comprises a cloud-based storage. In some examples, the second data source and the trusted data source comprise a same data source. In some examples, the targeted version of the file comprises a latest version of the file stored at the first data source, a latest version of the file stored at the first data source within a configured time window, a latest version of the file stored at the first data source before an event, or an earliest version of the file stored at the first data source.

In some examples, the encryption component 860 may be configured as or otherwise support a means for encrypting the cryptographic key associated with the archival location in the first data source using a user-supplied password to generate an encrypted version of the cryptographic key. In some examples, the uploading component 865 may be configured as or otherwise support a means for uploading the encrypted version of the cryptographic key to the first data source, wherein the cryptographic key is generated using symmetric key encryption.

Figure 9:
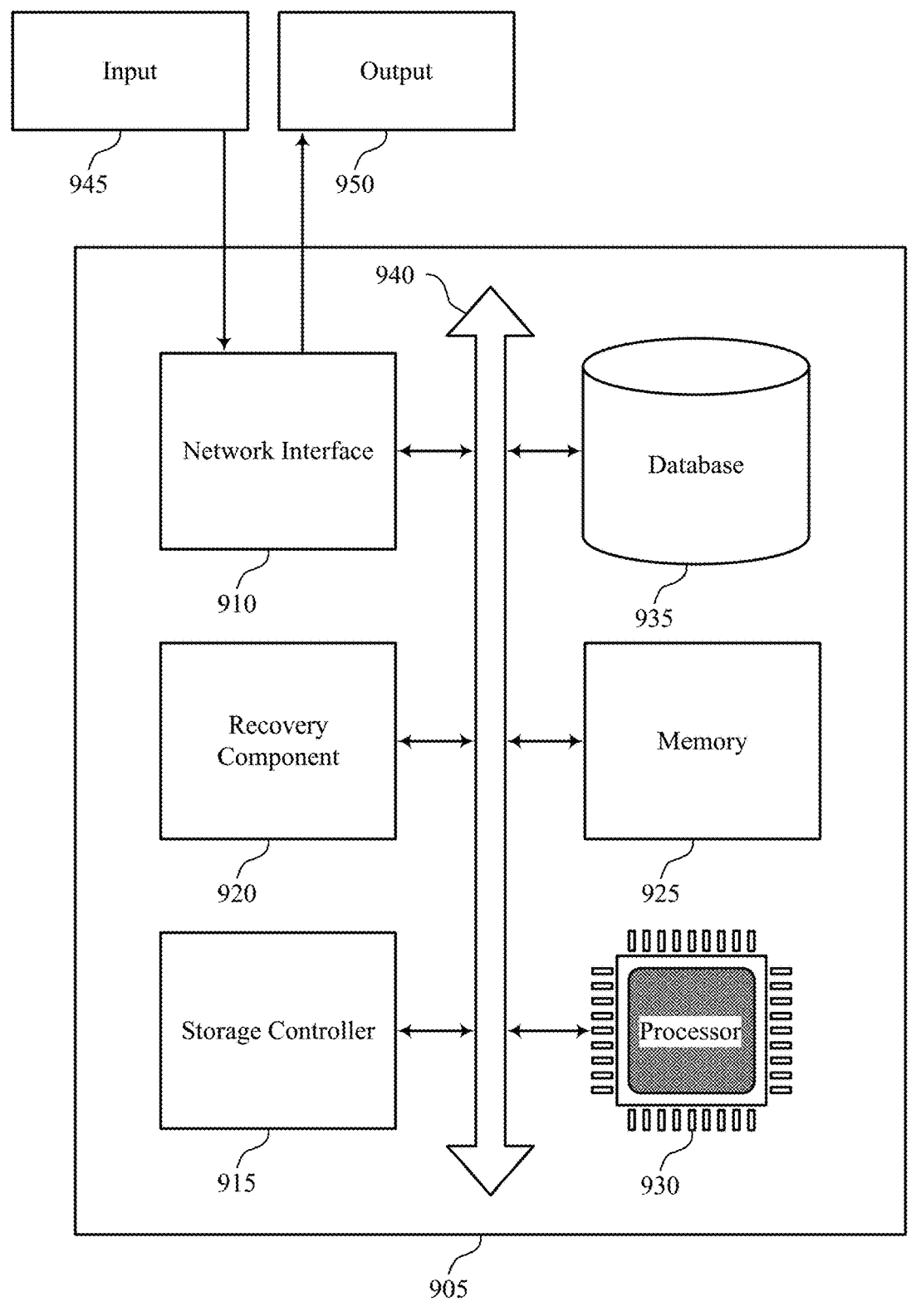
FIG. 9 shows a diagram of a system including a device that supports techniques for data retrieval using cryptographic signatures in accordance with aspects of the present disclosure.

FIG. 9 shows a diagram of a system 900 including a device 905 that supports techniques for data retrieval using cryptographic signatures in accordance with aspects of the present disclosure. The device 905 may be an example of or include the components of a device 705 as described herein. The device 905 may include components for bi-directional data communications including components for transmitting and receiving communications, such as a recovery manager 920, a network interface 910, a storage controller 915, a memory 925, a processor 930, and a database 935. These components may be in electronic communication or otherwise coupled (e.g., operatively, communicatively, functionally, electronically, electrically) via one or more buses (e.g., a bus 940).

The network interface 910 may manage input signals 945 and output signals 950 for the device 905. The network interface 910 may also manage communications with data sources not integrated into the device 905. In some cases, the network interface 910 may represent a physical connection, a wired connection, a wireless connection, or port to an external device. In some cases, the network interface 910 may utilize an operating system such as iOS®, ANDROID®, MS-DOS®, MS-WINDOWS®, OS/2®, UNIX®, LINUX®, or another known operating system. In other cases, the network interface 910 may represent or interact with one or more data sources (e.g., servers, data storage appliances, databases) or one or more devices or peripherals such as a modem, a keyboard, a mouse, a touchscreen, or a similar device. In some cases, the network interface 910 may be implemented as part of a processor 930. In some examples, a user may interact with the device 905 via the network interface 910 or via hardware components controlled by the network interface 910.

The storage controller 915 may manage data storage and processing in a database 935. In some cases, a user may interact with the storage controller 915. In other cases, the storage controller 915 may operate automatically without user interaction. The database 935 may be an example of a single database, a distributed database, multiple distributed databases, a data store, a data lake, or an emergency backup database.

Memory 925 may include random-access memory (RAM) and ROM or any other memory type as described with reference to FIGS. 1-3. The memory 925 may store computer-readable, computer-executable software including instructions that, when executed, cause the processor 930 to perform various functions described herein. In some cases, the memory 925 may contain, among other things, a BIOS which may control basic hardware or software operation such as the interaction with peripheral components or devices.

The processor 930 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting techniques for data retrieval using cryptographic signatures).

The recovery manager 920 may support transferring data from a first data source to a second data source in accordance with examples as disclosed herein. For example, the recovery manager 920 may be configured as or otherwise support a means for retrieving metadata for one or more versions of a plurality of versions of a file stored at the first data source, wherein the metadata for the one or more versions of the file comprises at least an identifier of the file, a timestamp associated with uploading of the file to the first data source, and a cryptographic signature, wherein generation of the cryptographic signature is based at least in part on the identifier of the file, the timestamp associated with the uploading of the file, and a cryptographic key associated with an archival location in the first data source. The recovery manager 920 may be configured as or otherwise support a means for identifying, from the plurality of versions of the file, a set of versions of the file that were uploaded from a trusted data source to the first data source based at least in part on a comparison of the cryptographic signature from the retrieved metadata for the one or more versions of the plurality of versions of the file to a computed cryptographic signature that is computed using at least the cryptographic key associated with the archival location in the first data source. The recovery manager 920 may be configured as or otherwise support a means for determining, from the set of versions of the file that were uploaded from the trusted data source to the first data source, a targeted version of the file. The recovery manager 920 may be configured as or otherwise support a means for retrieving the targeted version of the file from the first data source to the second data source based at least in part on the determining.

By including or configuring the recovery manager 920 in accordance with examples as described herein, the device 905 may support techniques for securely uploading data to and downloading data from a data source.

Figure 10:
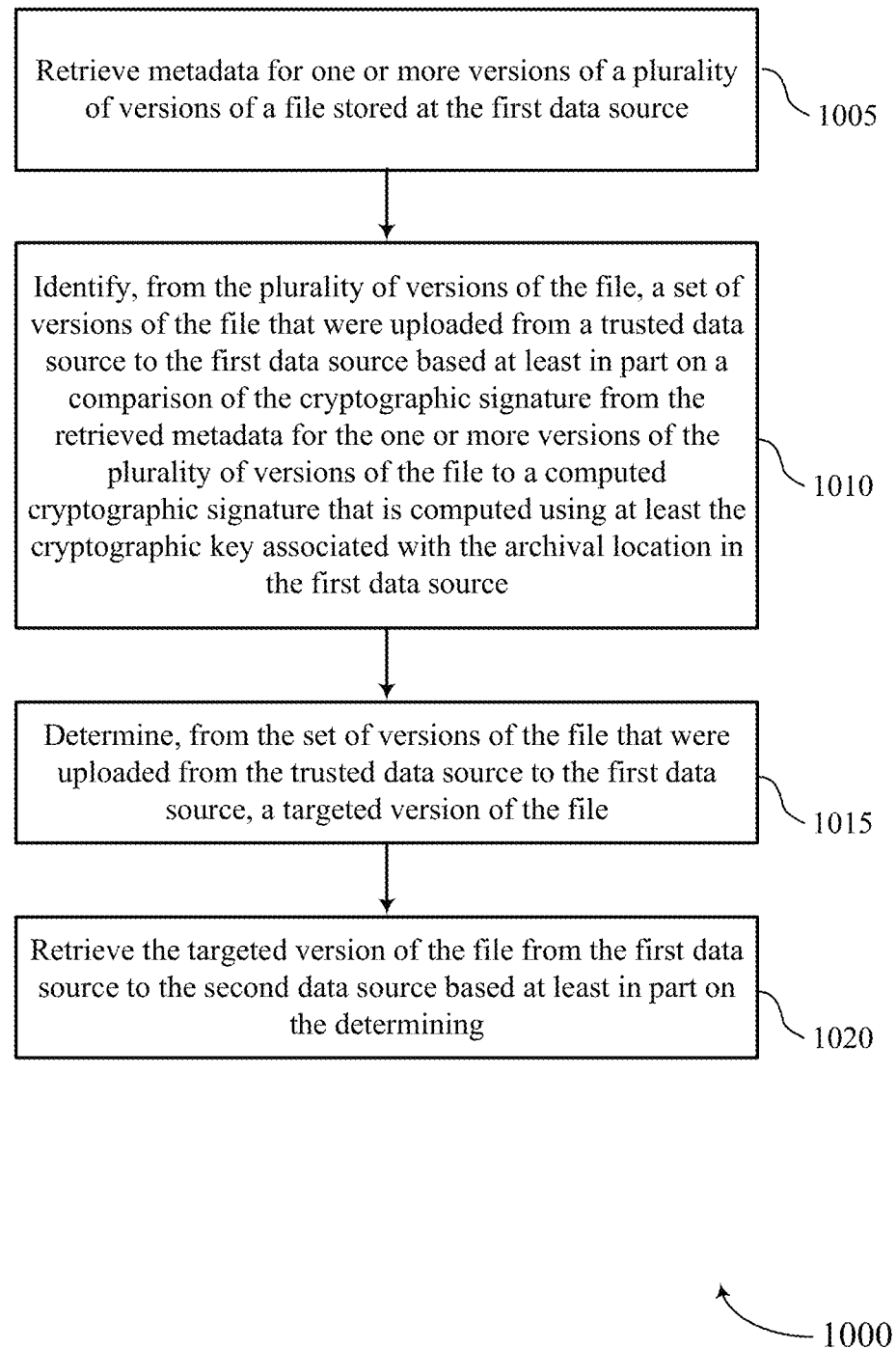
FIGS. 10 through 12 show a flowchart illustrating methods that support techniques for data retrieval using cryptographic signatures in accordance with aspects of the present disclosure.

FIG. 10 shows a flowchart illustrating a method 1000 that supports techniques for data retrieval using cryptographic signatures in accordance with aspects of the present disclosure. The operations of the method 1000 may be implemented by a data source or its components as described herein. For example, the operations of the method 1000 may be performed by a data source as described with reference to FIGS. 1 through 9. In some examples, a data source may execute a set of instructions to control the functional elements of the data source to perform the described functions. Additionally or alternatively, the data source may perform aspects of the described functions using special-purpose hardware.

At 1005, the method may include retrieving metadata for one or more versions of a plurality of versions of a file stored at the first data source. In some examples, the metadata for the one or more versions of the file comprises at least an identifier of the file, a timestamp associated with uploading of the file to the first data source, and a cryptographic signature, wherein generation of the cryptographic signature is based at least in part on the identifier of the file, the timestamp associated with the uploading of the file, and a cryptographic key associated with an archival location in the first data source. The operations of 1005 may be performed in accordance with examples as disclosed herein. In some examples, aspects of the operations of 1005 may be performed by a metadata retrieval component 825 as described with reference to FIG. 8.

At 1010, the method may include identifying, from the plurality of versions of the file, a set of versions of the file that were uploaded from a trusted data source to the first data source based at least in part on a comparison of the cryptographic signature from the retrieved metadata for the one or more versions of the plurality of versions of the file to a computed cryptographic signature that is computed using at least the cryptographic key associated with the archival location in the first data source. The operations of 1010 may be performed in accordance with examples as disclosed herein. In some examples, aspects of the operations of 1010 may be performed by a version identification component 830 as described with reference to FIG. 8.

At 1015, the method may include determining, from the set of versions of the file that were uploaded from the trusted data source to the first data source, a targeted version of the file. The operations of 1015 may be performed in accordance with examples as disclosed herein. In some examples, aspects of the operations of 1015 may be performed by a targeted version component 835 as described with reference to FIG. 8.

At 1020, the method may include retrieving the targeted version of the file from the first data source to the second data source based at least in part on the determining. The operations of 1020 may be performed in accordance with examples as disclosed herein. In some examples, aspects of the operations of 1020 may be performed by a targeted version component 835 as described with reference to FIG. 8.

Figure 11:
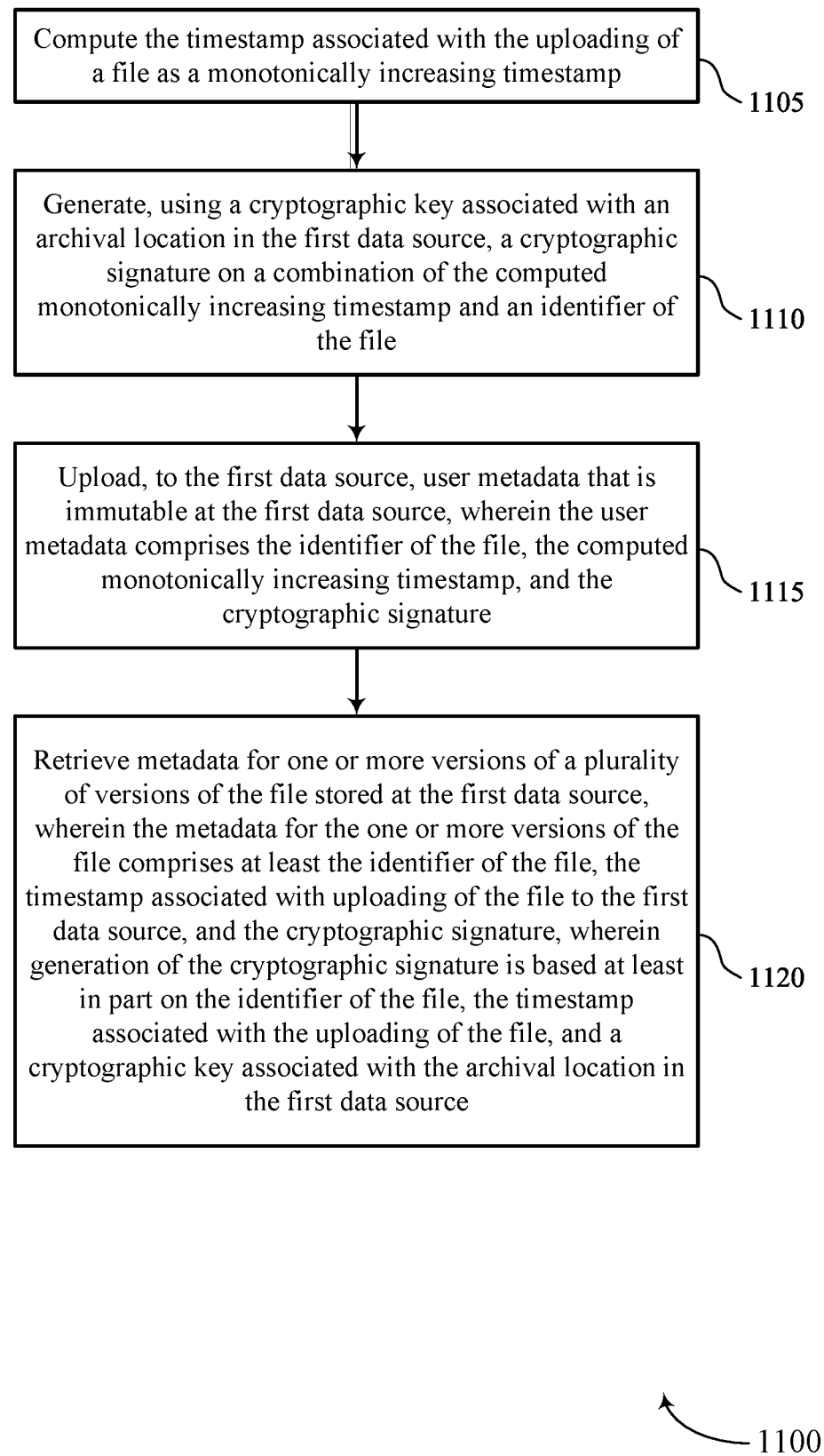

FIG. 11 shows a flowchart illustrating a method 1100 that supports techniques for data retrieval using cryptographic signatures in accordance with aspects of the present disclosure. The operations of the method 1100 may be implemented by a data source or its components as described herein. For example, the operations of the method 1100 may be performed by a data source as described with reference to FIGS. 1 through 9. In some examples, a data source may execute a set of instructions to control the functional elements of the data source to perform the described functions. Additionally or alternatively, the data source may perform aspects of the described functions using special-purpose hardware.

At 1105, the method may include computing the timestamp associated with the uploading of a file as a monotonically increasing timestamp. The operations of 1105 may be performed in accordance with examples as disclosed herein. In some examples, aspects of the operations of 1105 may be performed by a timestamp component 840 as described with reference to FIG. 8.

At 1110, the method may include generating, using a cryptographic key associated with an archival location in the first data source, a cryptographic signature on a combination of the computed monotonically increasing timestamp and an identifier of the file. The operations of 1110 may be performed in accordance with examples as disclosed herein. In some examples, aspects of the operations of 1110 may be performed by a cryptographic signature component 845 as described with reference to FIG. 8.

At 1115, the method may include uploading, to the first data source, user metadata that is immutable at the first data source, wherein the user metadata comprises the identifier of the file, the computed monotonically increasing timestamp, and the cryptographic signature. The operations of 1115 may be performed in accordance with examples as disclosed herein. In some examples, aspects of the operations of 1115 may be performed by an uploading component 865 as described with reference to FIG. 8.

At 1120, the method may include retrieving metadata for one or more versions of a plurality of versions of the file stored at the first data source, wherein the metadata for the one or more versions of the file comprises at least the identifier of the file, the timestamp associated with uploading of the file to the first data source, and the cryptographic signature, wherein generation of the cryptographic signature is based at least in part on the identifier of the file, the timestamp associated with the uploading of the file, and a cryptographic key associated with the archival location in the first data source. The metadata retrieval may be used to get the version information associated with the file that was uploaded and stored locally. The operations of 1120 may be performed in accordance with examples as disclosed herein. In some examples, aspects of the operations of 1120 may be performed by a metadata retrieval component 825 as described with reference to FIG. 8.

Figure 12:
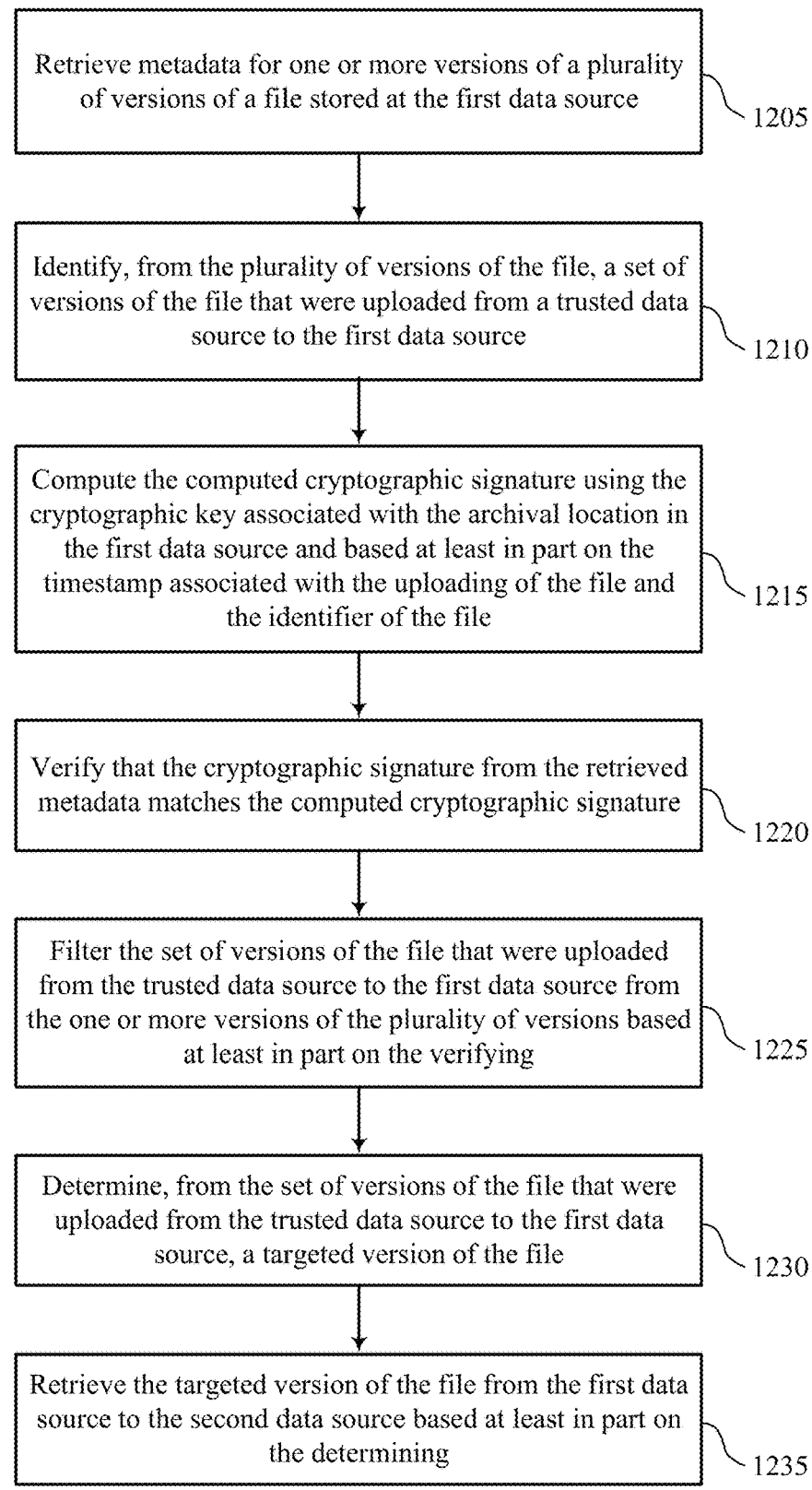

FIG. 12 shows a flowchart illustrating a method 1200 that supports techniques for data retrieval using cryptographic signatures in accordance with aspects of the present disclosure. The operations of the method 1200 may be implemented by a data source or its components as described herein. For example, the operations of the method 1200 may be performed by a data source as described with reference to FIGS. 1 through 9. In some examples, a data source may execute a set of instructions to control the functional elements of the data source to perform the described functions. Additionally or alternatively, the data source may perform aspects of the described functions using special-purpose hardware.

At 1205, the method may include retrieving metadata for one or more versions of a plurality of versions of a file stored at the first data source. In some examples, the metadata for the one or more versions of the file comprises at least an identifier of the file, a timestamp associated with uploading of the file to the first data source, and a cryptographic signature, wherein generation of the cryptographic signature is based at least in part on the identifier of the file, the timestamp associated with the uploading of the file, and a cryptographic key associated with an archival location in the first data source. The operations of 1205 may be performed in accordance with examples as disclosed herein. In some examples, aspects of the operations of 1205 may be performed by a metadata retrieval component 825 as described with reference to FIG. 8.

At 1210, the method may include identifying, from the plurality of versions of the file, a set of versions of the file that were uploaded from a trusted data source to the first data source. In some examples, the identifying may be based at least in part on a comparison of the cryptographic signature from the retrieved metadata for the one or more versions of the plurality of versions of the file to a computed cryptographic signature that is computed using at least the cryptographic key associated with the archival location in the first data source. The operations of 1210 may be performed in accordance with examples as disclosed herein. In some examples, aspects of the operations of 1210 may be performed by a version identification component 830 as described with reference to FIG. 8.

At 1215, the method may include computing the computed cryptographic signature using the cryptographic key associated with the archival location in the first data source and based at least in part on the timestamp associated with the uploading of the file and the identifier of the file. The operations of 1215 may be performed in accordance with examples as disclosed herein. In some examples, aspects of the operations of 1215 may be performed by a cryptographic signature component 845 as described with reference to FIG. 8.

At 1220, the method may include verifying that the cryptographic signature from the retrieved metadata matches the computed cryptographic signature. The operations of 1220 may be performed in accordance with examples as disclosed herein. In some examples, aspects of the operations of 1220 may be performed by a verification component 850 as described with reference to FIG. 8.

At 1225, the method may include filtering the set of versions of the file that were uploaded from the trusted data source to the first data source from the one or more versions of the plurality of versions based at least in part on the verifying. Steps 1205 through 1225 may be repeated multiple times to filter additional versions of the file or object in the first data source. The operations of 1225 may be performed in accordance with examples as disclosed herein. In some examples, aspects of the operations of 1225 may be performed by a filtering component 855 as described with reference to FIG. 8.

At 1230, the method may include determining, from the set of versions of the file that were uploaded from the trusted data source to the first data source, a targeted version of the file. The operations of 1230 may be performed in accordance with examples as disclosed herein. In some examples, aspects of the operations of 1230 may be performed by a targeted version component 835 as described with reference to FIG. 8.

At 1235, the method may include retrieving the targeted version of the file from the first data source to the second data source based at least in part on the determining. The operations of 1235 may be performed in accordance with examples as disclosed herein. In some examples, aspects of the operations of 1235 may be performed by a targeted version component 835 as described with reference to FIG. 8.

A method for transferring data from a first data source to a second data source is described. The method may include retrieving metadata for one or more versions of a plurality of versions of a file stored at the first data source, wherein the metadata for the one or more versions of the file comprises at least an identifier of the file, a timestamp associated with uploading of the file to the first data source, and a cryptographic signature, wherein generation of the cryptographic signature is based at least in part on the identifier of the file, the timestamp associated with the uploading of the file, and a cryptographic key associated with an archival location in the first data source, identifying, from the plurality of versions of the file, a set of versions of the file that were uploaded from a trusted data source to the first data source based at least in part on a comparison of the cryptographic signature from the retrieved metadata for the one or more versions of the plurality of versions of the file to a computed cryptographic signature that is computed using at least the cryptographic key associated with the archival location in the first data source, determining, from the set of versions of the file that were uploaded from the trusted data source to the first data source, a targeted version of the file, and retrieving the targeted version of the file from the first data source to the second data source based at least in part on the determining.

An apparatus for transferring data from a first data source to a second data source is described. The apparatus may include a processor, memory coupled with the processor, and instructions stored in the memory. The instructions may be executable by the processor to cause the apparatus to retrieve metadata for one or more versions of a plurality of versions of a file stored at the first data source, wherein the metadata for the one or more versions of the file comprises at least an identifier of the file, a timestamp associated with uploading of the file to the first data source, and a cryptographic signature, wherein generation of the cryptographic signature is based at least in part on the identifier of the file, the timestamp associated with the uploading of the file, and a cryptographic key associated with an archival location in the first data source, identify, from the plurality of versions of the file, a set of versions of the file that were uploaded from a trusted data source to the first data source based at least in part on a comparison of the cryptographic signature from the retrieved metadata for the one or more versions of the plurality of versions of the file to a computed cryptographic signature that is computed using at least the cryptographic key associated with the archival location in the first data source, determine, from the set of versions of the file that were uploaded from the trusted data source to the first data source, a targeted version of the file, and retrieve the targeted version of the file from the first data source to the second data source based at least in part on the determining.

Another apparatus for transferring data from a first data source to a second data source is described. The apparatus may include means for retrieving metadata for one or more versions of a plurality of versions of a file stored at the first data source, wherein the metadata for the one or more versions of the file comprises at least an identifier of the file, a timestamp associated with uploading of the file to the first data source, and a cryptographic signature, wherein generation of the cryptographic signature is based at least in part on the identifier of the file, the timestamp associated with the uploading of the file, and a cryptographic key associated with an archival location in the first data source, means for identifying, from the plurality of versions of the file, a set of versions of the file that were uploaded from a trusted data source to the first data source based at least in part on a comparison of the cryptographic signature from the retrieved metadata for the one or more versions of the plurality of versions of the file to a computed cryptographic signature that is computed using at least the cryptographic key associated with the archival location in the first data source, means for determining, from the set of versions of the file that were uploaded from the trusted data source to the first data source, a targeted version of the file, and means for retrieving the targeted version of the file from the first data source to the second data source based at least in part on the determining.

A non-transitory computer-readable medium storing code for transferring data from a first data source to a second data source is described. The code may include instructions executable by a processor to retrieve metadata for one or more versions of a plurality of versions of a file stored at the first data source, wherein the metadata for the one or more versions of the file comprises at least an identifier of the file, a timestamp associated with uploading of the file to the first data source, and a cryptographic signature, wherein generation of the cryptographic signature is based at least in part on the identifier of the file, the timestamp associated with the uploading of the file, and a cryptographic key associated with an archival location in the first data source, identify, from the plurality of versions of the file, a set of versions of the file that were uploaded from a trusted data source to the first data source based at least in part on a comparison of the cryptographic signature from the retrieved metadata for the one or more versions of the plurality of versions of the file to a computed cryptographic signature that is computed using at least the cryptographic key associated with the archival location in the first data source, determine, from the set of versions of the file that were uploaded from the trusted data source to the first data source, a targeted version of the file, and retrieve the targeted version of the file from the first data source to the second data source based at least in part on the determining.

Some examples of the method, apparatuses, and non-transitory computer-readable medium described herein may further include operations, features, means, or instructions for computing the timestamp associated with the uploading of the file as a monotonically increasing timestamp and generating, using the cryptographic key associated with the archival location in the first data source, the cryptographic signature on a combination of the computed monotonically increasing timestamp and the identifier of the file.

Some examples of the method, apparatuses, and non-transitory computer-readable medium described herein may further include operations, features, means, or instructions for uploading, to the first data source, user metadata that may be immutable at the first data source, wherein the user metadata comprises the identifier of the file, the computed monotonically increasing timestamp, and the cryptographic signature. In some examples of the method, apparatuses, and non-transitory computer-readable medium described herein, the user metadata comprises a tuple of the identifier of the file, the computed monotonically increasing timestamp, and the cryptographic signature.

Some examples of the method, apparatuses, and non-transitory computer-readable medium described herein may further include operations, features, means, or instructions for checking, at the second data source, for local metadata that indicates a version identifier that uniquely identifies the targeted version of the file, wherein retrieving the metadata for the one or more versions of the plurality of versions of the file stored at the first data source may be based at least in part on an absence from the local metadata of the version identifier that uniquely identifies the targeted version.

In some examples of the method, apparatuses, and non-transitory computer-readable medium described herein, identifying the set of versions of the file that were uploaded from the trusted data source to the first data source may include operations, features, means, or instructions for computing the computed cryptographic signature using the cryptographic key associated with the archival location in the first data source and based at least in part on the timestamp associated with the uploading of the file and the identifier of the file, verifying that the cryptographic signature from the retrieved metadata matches the computed cryptographic signature, and filtering the set of versions of the file that were uploaded from the trusted data source to the first data source from the one or more versions of the plurality of versions based at least in part on the verifying.

Some examples of the method, apparatuses, and non-transitory computer-readable medium described herein may further include operations, features, means, or instructions for determining, from the retrieved metadata, that at least two versions of the one or more versions of the file may be associated with a same metadata tuple comprising a same identifier of the file, a same timestamp associated with the uploading of the file, and a same cryptographic signature.

Some examples of the method, apparatuses, and non-transitory computer-readable medium described herein may further include operations, features, means, or instructions for comparing immutable timestamps allocated by the first data source to the at least two versions of the file based at least in part on determining that the at least two versions of the one or more versions of the file may be associated with the same metadata tuple and selecting an earliest immutable timestamp from the immutable timestamps allocated by the first data source to the at least two versions of the file.

Some examples of the method, apparatuses, and non-transitory computer-readable medium described herein may further include operations, features, means, or instructions for determining the targeted version of the file may be based at least in part on selecting the earliest immutable timestamp. In some examples of the method, apparatuses, and non-transitory computer-readable medium described herein, the cryptographic signature comprises a hash-based message authentication code signature.

In some examples of the method, apparatuses, and non-transitory computer-readable medium described herein, the second data source comprises a local data source and the first data source comprises a remote data source. In some examples of the method, apparatuses, and non-transitory computer-readable medium described herein, the remote data source comprises a cloud-based storage. In some examples of the method, apparatuses, and non-transitory computer-readable medium described herein, the second data source and the trusted data source comprise a same data source.

In some examples of the method, apparatuses, and non-transitory computer-readable medium described herein, the targeted version of the file comprises a latest version of the file stored at the first data source, a latest version of the file stored at the first data source within a configured time window, a latest version of the file stored at the first data source before an event, or an earliest version of the file stored at the first data source.

Some examples of the method, apparatuses, and non-transitory computer-readable medium described herein may further include operations, features, means, or instructions for encrypting the cryptographic key associated with the archival location in the first data source using a user-supplied password to generate an encrypted version of the cryptographic key and uploading the encrypted version of the cryptographic key to the first data source, wherein the cryptographic key may be generated using symmetric key encryption.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for transferring data from a first data source to a second data source, comprising:
    retrieving metadata for one or more versions of a plurality of versions of a file stored at the first data source, wherein the metadata for the one or more versions of the file comprises at least an identifier of the file, a timestamp associated with uploading of the file to the first data source, and a cryptographic signature, wherein generation of the cryptographic signature is based at least in part on the identifier of the file, the timestamp associated with the uploading of the file, and a cryptographic key associated with an archival location in the first data source;
    identifying, from the plurality of versions of the file, a set of versions of the file that were uploaded from a trusted data source to the first data source based at least in part on a comparison of the cryptographic signature from the retrieved metadata for the one or more versions of the plurality of versions of the file to a computed cryptographic signature that is computed using at least the cryptographic key associated with the archival location in the first data source;

determining, from the set of versions of the file that were uploaded from the trusted data source to the first data source, a targeted version of the file; and retrieving the targeted version of the file from the first data source to the second data source based at least in part on the determining.

2. The method of claim 1, further comprising:
computing the timestamp associated with the uploading of the file as a monotonically increasing timestamp; and
generating, using the cryptographic key associated with the archival location in the first data source, the cryptographic signature on a combination of the computed monotonically increasing timestamp and the identifier of the file.

3. The method of claim 2, further comprising:
uploading, to the first data source, user metadata that is immutable at the first data source, wherein the user metadata comprises the identifier of the file, the computed monotonically increasing timestamp, and the cryptographic signature.

4. The method of claim 3, wherein the user metadata comprises a tuple of the identifier of the file, the computed monotonically increasing timestamp, and the cryptographic signature.

5. The method of claim 1, further comprising:
checking, at the second data source, for local metadata that indicates a version identifier that uniquely identifies the targeted version of the file, wherein retrieving the metadata for the one or more versions of the plurality of versions of the file stored at the first data source is based at least in part on an absence from the local metadata of the version identifier that uniquely identifies the targeted version.

6. The method of claim 1, wherein identifying the set of versions of the file that were uploaded from the trusted data source to the first data source comprises:
computing the computed cryptographic signature using the cryptographic key associated with the archival location in the first data source and based at least in part on the timestamp associated with the uploading of the file and the identifier of the file;
verifying that the cryptographic signature from the retrieved metadata matches the computed cryptographic signature; and
filtering the set of versions of the file that were uploaded from the trusted data source to the first data source from the one or more versions of the plurality of versions based at least in part on the verifying.

7. The method of claim 1, further comprising:
determining, from the retrieved metadata, that at least two versions of the one or more versions of the file are associated with a same metadata tuple comprising a same identifier of the file, a same timestamp associated with the uploading of the file, and a same cryptographic signature.

8. The method of claim 7, further comprising:
comparing immutable timestamps allocated by the first data source to the at least two versions of the file based at least in part on determining that the at least two versions of the one or more versions of the file are associated with the same metadata tuple; and selecting an earliest immutable timestamp from the immutable timestamps allocated by the first data source to the at least two versions of the file.

9. The method of claim 7, wherein determining the targeted version of the file is based at least in part on selecting the earliest immutable timestamp.

10. The method of claim 1, wherein the cryptographic signature comprises a hash-based message authentication code signature.

11. The method of claim 1, wherein the second data source comprises a local data source and the first data source comprises a remote data source.

12. The method of claim 11, wherein the remote data source comprises a cloud-based storage.

13. The method of claim 11, wherein the second data source and the trusted data source comprise a same data source.

14. The method of claim 11, wherein the targeted version of the file comprises a latest version of the file stored at the first data source, a latest version of the file stored at the first data source within a configured time window, a latest version of the file stored at the first data source before an event, or an earliest version of the file stored at the first data source.

15. The method of claim 1, further comprising:
encrypting the cryptographic key associated with the archival location in the first data source using a user-supplied password to generate an encrypted version of the cryptographic key; and
uploading the encrypted version of the cryptographic key to the first data source, wherein the cryptographic key is generated using symmetric key encryption.

16. An apparatus for transferring data from a first data source to a second data source, comprising:
a processor;
memory coupled with the processor; and
instructions stored in the memory and executable by the processor to cause the apparatus to:
retrieve metadata for one or more versions of a plurality of versions of a file stored at the first data source, wherein the metadata for the one or more versions of the file comprises at least an identifier of the file, a timestamp associated with uploading of the file to the first data source, and a cryptographic signature, wherein generation of the cryptographic signature is based at least in part on the identifier of the file, the timestamp associated with the uploading of the file, and a cryptographic key associated with an archival location in the first data source;
identify, from the plurality of versions of the file, a set of versions of the file that were uploaded from a trusted data source to the first data source based at least in part on a comparison of the cryptographic signature from the retrieved metadata for the one or more versions of the plurality of versions of the file to a computed cryptographic signature that is computed using at least the cryptographic key associated with the archival location in the first data source;
determine, from the set of versions of the file that were uploaded from the trusted data source to the first data source, a targeted version of the file; and
retrieve the targeted version of the file from the first data source to the second data source based at least in part on the determining.

17. The apparatus of claim 16, wherein the instructions are further executable by the processor to cause the apparatus to:
compute the timestamp associated with the uploading of the file as a monotonically increasing timestamp; and
generate, using the cryptographic key associated with the archival location in the first data source, the cryptographic signature on a combination of the computed monotonically increasing timestamp and the identifier of the file.

18. The apparatus of claim 17, wherein the instructions are further executable by the processor to cause the apparatus to:
upload, to the first data source, user metadata that is immutable at the first data source, wherein the user metadata comprises the identifier of the file, the computed monotonically increasing timestamp, and the cryptographic signature.

19. The apparatus of claim 18, wherein the user metadata comprises a tuple of the identifier of the file, the computed monotonically increasing timestamp, and the cryptographic signature.

20. A non-transitory computer-readable medium storing code for transferring data from a first data source to a second data source, the code comprising instructions executable by a processor to:
retrieve metadata for one or more versions of a plurality of versions of a file stored at the first data source, wherein the metadata for the one or more versions of the file comprises at least an identifier of the file, a timestamp associated with uploading of the file to the first data source, and a cryptographic signature, wherein generation of the cryptographic signature is based at least in part on the identifier of the file, the timestamp associated with the uploading of the file, and a cryptographic key associated with an archival location in the first data source;
identify, from the plurality of versions of the file, a set of versions of the file that were uploaded from a trusted data source to the first data source based at least in part on a comparison of the cryptographic signature from the retrieved metadata for the one or more versions of the plurality of versions of the file to a computed cryptographic signature that is computed using at least the cryptographic key associated with the archival location in the first data source;
determine, from the set of versions of the file that were uploaded from the trusted data source to the first data source, a targeted version of the file; and
retrieve the targeted version of the file from the first data source to the second data source based at least in part on the determining.

\* \* \* \* \*